US011929499B2

United States Patent
Ouyang et al.

(10) Patent No.: US 11,929,499 B2
(45) Date of Patent: Mar. 12, 2024

(54) LITHIUM MANGANATE POSITIVE ELECTRODE ACTIVE MATERIAL AS WELL AS POSITIVE ELECTRODE SHEET, SECONDARY BATTERY, BATTERY MODULE, BATTERY PACK AND POWERED DEVICE COMPRISING THE SAME

(71) Applicant: CONTEMPORARY AMPEREX TECHNOLOGY CO., LIMITED, Ningde (CN)

(72) Inventors: Shaocong Ouyang, Ningde (CN); Chenghua Fu, Ningde (CN); Tingzhen Xie, Ningde (CN); Bo Wang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/864,483

(22) Filed: Jul. 14, 2022

(65) Prior Publication Data

US 2022/0384800 A1 Dec. 1, 2022

Related U.S. Application Data

(63) Continuation of application No. PCT/CN2021/097631, filed on Jun. 1, 2021.

(51) Int. Cl.
*H01M 4/50* (2010.01)
*H01M 4/04* (2006.01)
(Continued)

(52) U.S. Cl.
CPC .......... *H01M 4/505* (2013.01); *H01M 4/043* (2013.01); *H01M 4/525* (2013.01);
(Continued)

(58) Field of Classification Search
None
See application file for complete search history.

(56) References Cited

U.S. PATENT DOCUMENTS 9,023,526 B2 * 5/2015 Song .................... H01M 4/505
429/223

FOREIGN PATENT DOCUMENTS

CN 102646826 * 8/2012 ............. Y02E 60/10
CN 102 646 826 B 2/2015
(Continued)

OTHER PUBLICATIONS

Yunjian Liu et al., Improvement of storage performance of LiMn2O4/graphite battery with AlF3-coated LiMn2O4, 2013, Ionics, vol. 19, pp. 1241-1246. (Year: 2013).*
(Continued)

*Primary Examiner* — Maria Laios
*Assistant Examiner* — Angela J. Martin
(74) *Attorney, Agent, or Firm* — LADAS & PARRY LLP

(57) ABSTRACT

A lithium manganate positive electrode active material, comprising a lithium manganate matrix and a cladding layer as a "barrier layer" and a "functional layer" are described. The cladding layer can not only "prevent" the transition metal ions which have been produced by the lithium manganate matrix from directly "running" into the electrolyte solution, but also "prevent" the hydrofluoric acid in the electrolyte solution from directly contacting with the lithium manganate substrate, and then prevent the lithium manganate matrix from dissolving out more transition metal manganese ions; as a "functional layer", the cladding layer contains various effective ingredients inside, which can reduce the transition metal manganese ions already present inside the battery through chemical reactions or adsorption effects, thus slowing down the generation of transition metal
(Continued)

manganese and the decomposition of the SEI film (solid electrolyte interphase film) catalyzed by the transition metal manganese.

15 Claims, 5 Drawing Sheets

(51) Int. Cl.
 H01M 4/505 (2010.01)
 H01M 4/52 (2010.01)
 H01M 4/525 (2010.01)
 H01M 10/05 (2010.01)
 H01M 10/0525 (2010.01)
 H01M 4/02 (2006.01)

(52) U.S. Cl.
 CPC .. *H01M 10/0525* (2013.01); *H01M 2004/021* (2013.01); *H01M 2004/028* (2013.01)

(56) References Cited

FOREIGN PATENT DOCUMENTS

| | | | | |
|---|---|---|---|---|
| CN | 105 118 988 | A | 12/2015 | |
| CN | 107591532 | A | 1/2018 | |
| CN | 108666534 | A | 10/2018 | |
| CN | 108878852 | A | 11/2018 | |
| CN | 110808363 | A | 2/2020 | |
| CN | 111606361 | * | 9/2020 | ............ C01G 53/00 |
| CN | 111606361 | A | 9/2020 | |
| CN | 11785973 | A | 10/2020 | |
| CN | 111793824 | A | 10/2020 | |
| CN | 112599779 | A | 4/2021 | |
| EP | 3121874 | A1 * | 7/2015 | ............. H01M 4/04 |
| EP | 3 121 874 | A1 | 1/2017 | |
| JP | 2008536285 | A | 9/2008 | |
| JP | 2009043477 | A | 2/2009 | |
| JP | 2014032776 | A | 2/2014 | |
| JP | 2016225046 | A | 12/2016 | |
| JP | 2019175630 | A | 10/2019 | |
| JP | 2020513653 | A | 5/2020 | |
| KR | 20190132496 | A | 11/2019 | |
| TW | 201218489 | A | 5/2012 | |

OTHER PUBLICATIONS

Notice of Allowance for KR 10-2022-7026336 dated Sep. 14, 2022.
ISR for International Application PCT/CN2021/097631 dated Jan. 27, 2022 (Jan. 27, 2022).
Written Opinion for International Application PCT/CN2021/097631 dated Jan. 27, 2022 (Jan. 27, 2022).
European Search Report, dated Mar. 14, 2023, corresponding to EP Application No. 21 91 2319.
Liu Yunjian et al: "Improvement of storage performance of LiMn2O4/graphite battery with AlF3-coated LiMn2O4", Ionics, [Online], vol. 19, No. 9, Jan. 24, 2013, pp. 1241-1246, XP093028113.
Hu Enyuan et al: "Thermal stability in the blended lithium manganese oxide—Lithium nickel cobalt manganese oxide cathode materials: An in situ time-resolved X-Ray diffraction and mass spectroscopy study", Journal of Power Sources, Elsevier, Amsterdam, NL, [Online], vol. 277, Dec. 4, 2014, pp. 193-197, XP029129596.
JP1-OA1 for copending application 2022-548010 of Jul. 31, 2023.

* cited by examiner

LITHIUM MANGANATE POSITIVE ELECTRODE ACTIVE MATERIAL AS WELL AS POSITIVE ELECTRODE SHEET, SECONDARY BATTERY, BATTERY MODULE, BATTERY PACK AND POWERED DEVICE COMPRISING THE SAME

CROSS-REFERENCE TO RELATED APPLICATIONS

This application is a continuation of PCPCN2021/97631 filed on Jun. 1, 2021, which is incorporated herein by reference in its entirety.

TECHNICAL FIELD

The present application relates to the field of electrochemistry, and in particular to a lithium manganate positive electrode active material and its preparation method as well as a positive electrode sheet, a secondary battery, a battery module, a battery pack and a powered device comprising the same.

BACKGROUND ART

With the rapid development of new energy fields, lithium-ion batteries are widely used in various large power plants, energy storage systems and various consumer products, especially in the field of new energy vehicles such as all-electric vehicles and hybrid electric vehicles by virtue of their excellent electrochemical performance, memoryless effect, less environmental pollution and other advantages.

With the popularization of consumer electronics and new energy vehicles, consumers have put forward higher requirements on the range and service life of lithium-ion batteries. However, the current lithiumion batteries are difficult to meet the increasing demands, and therefore, it is one of the main research and development directions to design a lithium-ion battery with both cycling performance and rate performance on the premise of ensuring a lower preparation cost.

Among the commonly used positive electrode active materials for lithium-ion batteries, lithium manganate has become a widely used positive electrode active material for lithium-ion batteries due to its abundant raw materials, simple preparation, low price and high safety. However, during the deep charging and discharging of a lithium-ion battery, the lithium manganate material is prone to lattice distortion and corrosion by hydrofluoric acid in electrolyte solution, so transition metals are prone to dissolution, resulting in poor cycling performance and rate performance of the battery. Therefore, it is of great significance to develop a lithium manganate material that reduces the precipitation of transition metal manganese.

SUMMARY OF THE INVENTION

The present application has been made in view of the above-mentioned topics, and the objective is to provide a lithium manganate positive electrode active material that increases battery capacity retention rate, reduces battery impedance and improves rate performance, as well as a positive electrode sheet, a secondary battery, a battery module, a battery pack and a powered device comprising the same. On the premise of low cost advantage, the lithium manganate positive electrode active material of the present application can significantly improve the range and service life of lithium-ion batteries.

An objective of the present application is to provide a lithium manganate positive electrode active material that improves transition metal manganese precipitation.

Another objective of the present application is to provide a lithium manganate positive electrode active material having significantly improved battery capacity retention rate while enabling higher rate performance.

The inventors have found that one or more of the above objectives can be achieved by adopting the technical solutions of the present application.

A first aspect of the present application provides a lithium manganate positive electrode active material comprising a lithium manganate matrix and a cladding layer, wherein the cladding layer comprises an inner layer provided on the surface of the lithium manganate matrix, an interlayer provided on the surface of the inner layer, and an outer layer provided on the surface of the interlayer, wherein the inner layer comprises one or more of oxyacid salts of aluminum, calcium and/or magnesium; the interlayer is an organic bonding material layer; and the outer layer is an oxalate and/or silicate layer.

In any of embodiments, the oxyacid salt of aluminum, calcium and/or magnesium is selected from one or more of potassium aluminate, magnesium aluminate calcium carbonate, calcium aluminate, magnesium carbonate, and magnesium aluminate.

A second aspect of the present application provides a lithium manganate positive electrode active material comprising a lithium manganate matrix and a cladding layer, wherein the cladding layer comprises an inner layer provided on the surface of the lithium manganate matrix, an interlayer provided on the surface of the inner layer, and an outer layer provided on the surface of the interlayer, wherein the inner layer comprises one or more of fluorides of aluminum, calcium and/or magnesium; the interlayer is an organic bonding material layer; and the outer layer is an oxalate and/or silicate layer.

In any of embodiments, the fluoride is one or more of aluminum fluoride, calcium fluoride, and magnesium fluoride.

In any of embodiments, the organic bonding material is selected from one or more of carboxymethyl cellulose salt, alginate salt, and polyacrylate salt, and optionally is one or more of sodium carboxymethyl cellulose, potassium carboxymethyl cellulose, lithium carboxymethyl cellulose, sodium alginate, potassium alginate, lithium alginate, magnesium alginate, aluminum alginate, sodium polyacrylate, potassium polyacrylate, and magnesium polyacrylate.

In any of embodiments, the oxalate is selected from an alkali metal salt, an alkaline earth metal salt or an ammonium salt of oxalic acid, optionally is one or more of potassium oxalate, lithium oxalate, magnesium oxalate, and sodium oxalate, and more optionally is one or more of potassium oxalate, lithium oxalate, and sodium oxalate;

The silicate is selected from an alkali metal salt, an alkaline earth metal salt or an ammonium salt of silicic acid, optionally is one or more of lithium silicate, sodium silicate, and potassium silicate.

In any of embodiments, the mass ratio of the inner layer to the lithium manganate matrix is 0.01-3:100, and optionally is 1-2:100.

In any of embodiments, the mass ratio of the interlayer to the lithium manganate matrix is 0.5-3:100, more optionally is 1-2:100.

In any of embodiments, the mass ratio of the outer layer to the lithium manganate matrix is 0.5-12:100, and optionally is 0.5-6:100.

In any of embodiments, the mass ratio of the inner layer:interlayer:outer layer is 1-2:1-2:0.5-6:

In any of embodiments, the mass ratio of the oxalate to the silicate is 0.01-99:1, optionally is 0.1-9:1, more optionally is 0.75-4:1.

In any of embodiments, the manganate positive electrode active material has a multi-level pore structure with an average pore size of 15-20 nm and a porosity of 10-20%.

In any of embodiments, the interlayer has a rough surface obtained by hydrochloric acid etching.

In any of embodiments, the lithium manganate positive electrode active material has a volume average particle size D50 of 12-14 μm.

In any of embodiments, the cladding layer has a thickness of 0.3-5.2 μm, optionally 0.7-2.0 μm, more optionally 1.2-1.7 μm.

A third aspect of the present application provides a method for preparing a lithium manganate positive electrode active material, comprising:
  ball-milling one or more of oxyacid salts of aluminum, calcium and/or magnesium with a lithium manganate matrix to obtain a first intermediate, wherein the first intermediate utilizes the lithium manganate matrix as a substrate, and the surface of the lithium manganate matrix is cladded with the oxyacid salts of aluminum, calcium and/or magnesium:
  preparing an organic bonding material slurry, and coating the organic bonding material slurry on the surface of the first intermediate to obtain a second intermediate;
  preparing an oxalate and/or silicate slurry, and coating the oxalate and/or silicate slurry on the surface of the second intermediate to obtain the lithium manganate positive electrode active material; wherein,
  the lithium manganate positive electrode active material comprises a lithium manganate matrix and a cladding layer, wherein the cladding layer comprises an inner layer provided on the surface of the lithium manganate matrix, an interlayer provided on the surface of the inner layer, and an outer layer provided on the surface of the interlayer, wherein the inner layer comprises one or more of oxyacid salts of aluminum, calcium and/or magnesium the interlayer is an organic bonding material layer, and the outer layer is an oxalate and/or silicate layer.

The method for modifying lithium manganate according to the present application has the advantages of simple process and low cost, and is advantageous for large-scale industrialization.

In any of embodiments, based on the weight of the lithium manganate matrix, the organic bonding material slurry further comprises 1-3 wt % of a pore-forming agent, and the pore-forming agent is removed by applying a predetermined temperature to the second intermediate.

In any of embodiments, before cladding oxalate and/or silicate, the second intermediate is added to a hydrochloric acid solution, stirred for 40-120 min filtered and then oven dried.

A fourth aspect of the present application provides a positive electrode sheet, comprising the lithium manganate positive electrode active material of the first or second aspect of the present application or the lithium manganate positive electrode active material prepared according to the method of the third aspect of the present application.

In any of embodiments, optionally the positive electrode sheet further comprises a ternary nickel-cobalt-manganese material, and the mass ratio of the ternary nickel-cobalt-manganese material to the lithium manganate positive electrode active material is 0.01-0.99:1. The positive electrode sheet can be prepared using a method known in the prior art for preparing positive electrode sheets. The ternary nickel-cobalt-manganese material can be a ternary nickel-cobalt-manganese material known in the prior art for preparing the positive electrode sheet.

A fifth aspect of the present application provides a lithium-ion battery, comprising one or more of the lithium manganate positive electrode active material described in the first aspect or the second aspect of the present application, the lithium manganate positive electrode active material prepared according to the method of the third aspect of the present application, and the positive electrode sheet of the fourth aspect of the present application. The lithium-ion battery can be prepared using a method known in the prior art for preparing lithium-ion batteries.

A sixth aspect of the present application provides a battery module comprising the lithium-ion battery of the fifth aspect of the present application. The battery module can be prepared using a method known the prior art for preparing battery modules.

A seventh aspect of the present application provides a battery pack comprising one or more of the lithium-ion battery of the fifth aspect of the present application or the battery module of the sixth aspect of the present application. The battery pack can be prepared using a method known in the prior art for preparing battery packs.

An eighth aspect of the present application provides a powered device comprising one or more of the lithium-ion battery of the fifth aspect of the present application, the battery module of the sixth aspect of the present application, or the battery pack of the seventh aspect of the present application, wherein the lithium-ion battery or the battery module or the battery pack is used as a power source for the powered device or an energy storage unit for the powered device. The powered device can be prepared using a method known in the prior art for preparing powered devices.

Beneficial Effects

The lithium manganate positive electrode active material of the present application has a cladding structure, wherein the cladding layer dads the lithium manganate matrix, and as a "barrier layer" and a "functional layer" confers beneficial effects which are not possessed by conventional lithium manganate materials: during charging and discharging, the cladding layer can not only "prevent" the transition metal manganese ions which have been produced by the lithium manganate matrix from directly "running" into the electrolyte solution, but also "prevent" the hydrofluoric acid in the electrolyte solution from directly contacting with the lithium manganate substrate, and then prevent the lithium manganate matrix from dissolving out more transition metal manganese ions due to corrosion by the hydrofluoric acid in the electrolyte solution; in addition, as a "functional layer", the cladding layer contains various effective ingredients (oxyacid salts or fluorides of aluminum, calcium and/or magnesium; organic bonding materials; oxalates and/or silicates) inside, which can reduce the transition metal manganese ions already present inside the battery through chemical reactions of adsorption effects, thus slowing down the generation of transition metal manganese and the decomposition of the SEI (solid electrolyte interphase) film catalyzed by the transition metal manganese, thereby improving the cycling capacity retention rate of the battery.

The battery module, the battery pack and the powered device of the present application comprise the lithium-ion battery provided by the present application, and thus having at least the same advantages as that of the lithium-ion battery.

DESCRIPTION OF REFERENCE NUMERALS

Figure 1:
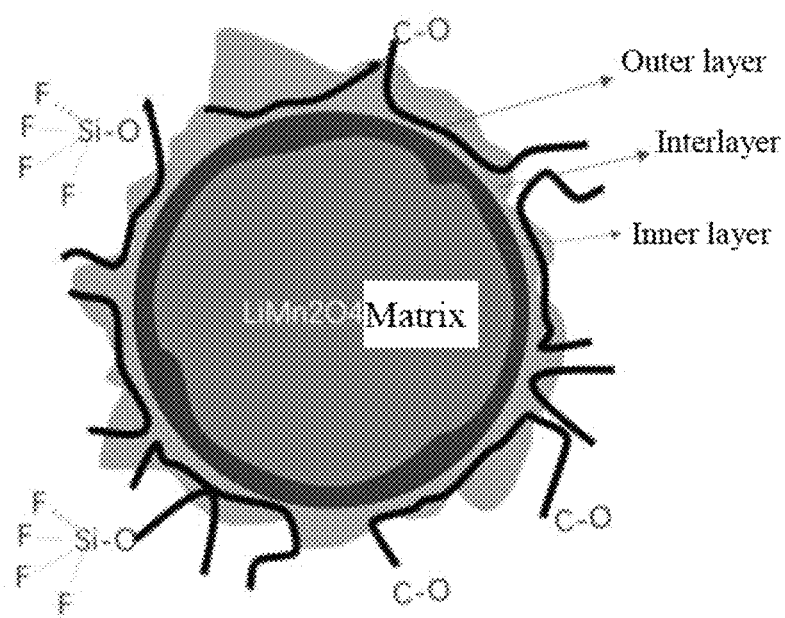
FIG. 1 is a schematic diagram showing the structure and action mode of a lithium manganate positive electrode active material according to an embodiment of the present application.
Figure 2:
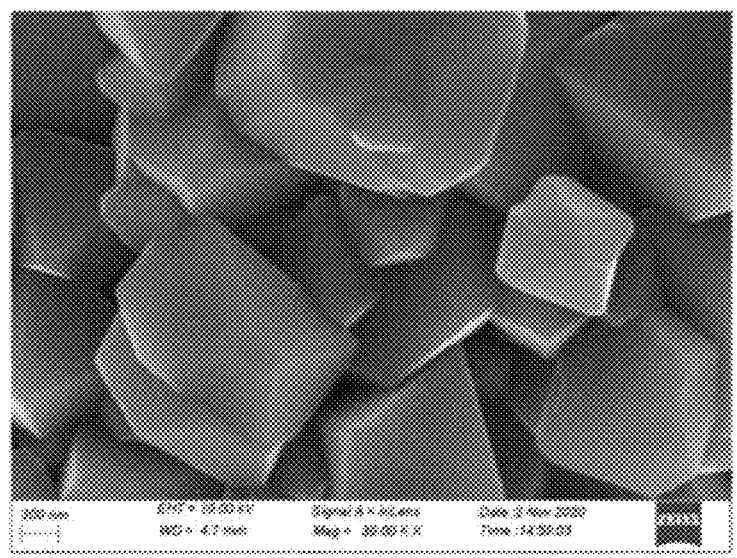
FIG. 2 is an SEM image of the lithium maganate positive electrode active material of Comparative example 1 of the present application.
Figure 3:
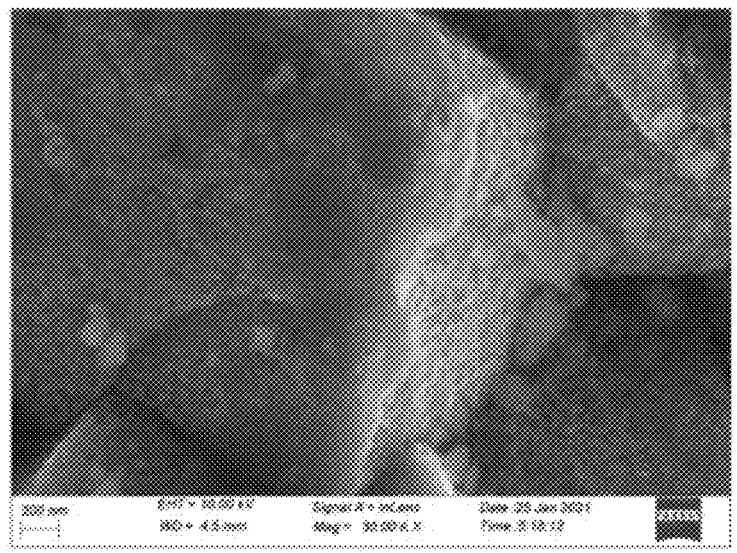
FIG. 3 is an SEM image of the lithium manganate positive electrode active material of Example 38 of the present application.

1 Battery pack
2 Upper box
3 Lower box
4 Battery module
5 Lithium-ion battery
51 Case
52 Electrode assembly
53 Top cover assembly

DETAILED DESCRIPTION

Hereinafter, the lithium manganate positive electrode active material and its preparation method, as well as the positive electrode sheet, the lithium-ion battery, the battery module, the battery pack and the powered device comprising the same will be described in detail and specifically disclosed with reference to the accompanying drawings, however, there may be cases where unnecessary detailed description is omitted. For example, in order to avoid unnecessary redundancy in the following descriptions and to facilitate the understanding of those skilled in the art, there are cases where detailed descriptions of well-known items and repeated descriptions of actually identical structures are omitted. In addition, the accompanying drawings and subsequent descriptions are provided for those skilled in the art to fully understand the present application, and are not intended to limit the subject matter recited in the claims.

For the sake of brevity, the present application specifically discloses some numerical ranges, and various numerical ranges can be combined with each other to form corresponding embodiments. Any lower limit can be combined with any upper limit to form a range not explicitly recited; and any lower limit can be combined with another lower limit to form a range not explicitly recited, and likewise, any upper limit can be combined with any another upper limit to form a range not explicitly recited. In addition, each individually disclosed point or individual numerical value can itself be used as a lower limit or an upper limit to combine with any another point or individual numerical value or with another lower limit or upper limit to form a range not explicitly recited.

Unless otherwise stated, the terms used herein have the well-known meanings commonly understood by those skilled in the art. In the present application, unless otherwise stated, "or more" and "or less" encompass the recited number; for example, "one or more of a and b" refers to at least one of a and b, e.g., a, b, or a and b. Likewise, "one or more" is meant to comprise at least one. In the description herein, unless otherwise stated, the term "or" is inclusive, that is, the phrase "A or B" means "A, B, or both A and B".

It should be noted that the term "cladding layer" refers to a portion that dads the lithium manganate matrix, the portion may but not necessarily completely clad the lithium manganate matrix, and the use of "cladding layer" is only for the convenience of description, and is not intended to limit the present application. Likewise, the term "thickness of the cladding layer" refers to the thickness of the portion that dads the lithium manganate matrix along the normal direction of the lithium manganate matrix. In the present application, the terms "inner layer", "interlayer", and "outer layer" are only for the convenience of description, and are not intended to limit the present application. The "overall thickness of the cladding layer" refers to the thickness of the whole cladding layer (including the inner layer, the interlayer and the outer layer) that clads the lithium manganate matrix along the normal direction of the lithium manganate matrix, the "thickness of the inner layer" refers to the thickness of the inner layer that clads the lithium manganate matrix along the normal direction of the lithium manganate matrix, the "thickness of the interlayer" refers to the thickness of the interlayer that clads the surface of the inner layer along the normal direction of the lithium manganate matrix, and the "thickness of the outer layer" refers to the thickness of the outer layer that clads the surface of the interlayer along the normal direction of the lithium manganate matrix.

It should be noted that the term "multi-level pore structure" as used herein is only for the convenience in describing that there may be different pore sizes in the cladding layer of the lithium manganate positive electrode active material. In order to improve the rate performance of the battery, in the present application, the lithium manganate positive electrode active material is subjected to pore-forming, and the size of pore channel is determined by the pore structure of the lithium manganate substrate itself and the pore-forming treatment to the organic bonding material layer of the interlayer in the present application.

Through many experiments, the inventors have found that for lithium manganate material containing transition metals, during deep charging and discharging, its structure is prone to lattice distortion, and it is easy to be corroded by the electrolyte solution that impregnates its structure (especially by the hydrofluoric acid produced by the decomposition of the electrolyte solution), so that $Mn^{3+}$ and/or $Mn^{4+}$ originally within the structure are dissolved out of the lattice structure of lithium manganate and further disproportionated into $Mn^{2+}$; these produced $Mn^{2+}$ gradually migrate to the surface of the negative electrode under the action of potential difference, and are further reduced to metallic manganese; the resulting metallic manganese is equivalent to a "catalyst", and will accelerate the decomposition of SEI film on the surface of the negative electrode, leading to its large-area damage or even complete loss.

In order to supplement the lost SET film, the active lithium, solvent, etc. inside the battery are continuously consumed to form a new SEI film, which reduces the content of active lithium actually contributing to charge and discharge, and irreversibly affects the battery capacity retention rate; secondly, the decomposition of SEI film catalyzed by metallic manganese is accompanied by the generation of a series of by-products, which deposit on the surface of the negative electrode, hindering the passage of lithium ions into and out of the negative electrode, thereby increasing the internal resistance of the battery and reducing the charge-discharge rate of the battery; and meanwhile, the continuous consumption of electrolyte in the electrolyte solution also deteriorates the conductivity of the electrolyte solution, increase, the resistance to lithium ion migration between the positive electrode and negative electrode, and eventually deteriorates the cycling performance and rate performance of the battery.

Through extensive experimentation and research, the inventors have found that the negative effects of transition metal manganese on batteries can be reduced from the following two aspects: the first aspect is to reduce the amount of $Mn^{2+}$ produced by the lithium manganate material, such as to prevent the lithium manganate material from directly contacting with the electrolyte solution containing hydrofluoric acid without hindrance, thereby slowing down the decomposition of lithium manganate by hydrofluoric acid; and the second aspect is to prevent $Mn^{2+}$ produced by the lithium manganate material from migrating to the negative electrode. Both of the above approaches can reduce the metallic manganese produced by the decomposition of SEI film. Therefore, from the above two aspects, the inventors have obtained a material capable of significantly improving the battery cycling performance by modifying the lithium manganate material.

However, certain of such modification means for lithium manganate material will inevitably reduce the rate performance of the battery, and the inventors have also found through extensive experimentation that, by providing a cladding layer, improving the content ratio of each layer of the cladding layer and improving the structure of the cladding layer (especially increasing the surface roughness and pore-forming treatment for the interlayer), the lithium-ion battery of the present application can have both good cycling rate and good rate performance as far as possible.

Lithium Manganate Positive Electrode Active Material

Referring to FIG. 1, a first aspect of the present application provides a lithium manganate positive electrode active material comprising a lithium manganate matrix and a cladding layer, wherein the cladding layer comprises an inner layer provided on the surface of the lithium manganate matrix, an interlayer provided on the surface of the inner layer, and an outer layer provided on the surface of the interlayer, wherein the inner layer comprises one or more of oxyacid salts of aluminum, calcium and/or magnesium; the interlayer is an organic bonding material layer; and the outer layer is an oxalate and/or silicate layer.

The lithium manganate positive electrode active material of the present application has a cladding structure, wherein the cladding layer clads the lithium manganate matrix, and as a "barrier layer" and a "functional layer" confers beneficial effects not possessed by conventional lithium manganate material: during charging and discharging, the cladding layer can not only "prevent" the transition metal manganese ions which have been produced by the lithium manganate matrix film directly "running" into the electrolyte solution, but also "prevent" the hydrofluoric acid in the electrolyte solution from directly contacting with the lithium manganate substrate, and then prevent the lithium manganate matrix from dissolving out more transition metal manganese ions due to corrosion by the hydrofluoric acid in the electrolyte solution; in addition, as a "functional layer", the cladding layer contains various effective ingredients (oxyacid salts of aluminum, calcium and/or magnesium; organic bonding materials; oxalates and/or silicates) inside, which can reduce the transition metal manganese ions already present inside the batter through chemical reactions or adsorption effects, thus slowing down the generation of transition metal manganese and the decomposition of the SEI film catalyzed by the transition metal manganese, thereby improving the cycling capacity retention rate of the battery.

In some embodiments, optionally the inner layer of the lithium manganate positive electrode active material comprises one or more of oxyacid salts of aluminum, calcium and/or magnesium.

In some embodiments, optionally the oxyacid salt of aluminum, calcium and/or magnesium is selected from one or more of potassium aluminate, magnesium aluminate, calcium carbonate, calcium aluminate magnesium carbonate, and magnesium aluminate.

The above-mentioned effective ingredients in the inner layer of the positive electrode active material of the present application can consume the hydrofluoric acid in the electrolyte solution. During multiple charge-discharge processes of the battery, part of the hydrofluoric acid passes through the outer layer and the interlayer to reach the inner layer, and the effective components in the inner layer reacts with the hydrofluoric acid reaching the surface of the inner layer, for example, aluminum carbonate reacts with the hydrofluoric acid to generate aluminum fluoride, water and carbon dioxide, or for example, potassium aluminate undergoes complex chemical reactions with the hydrofluoric acid, eventually generating aluminum fluoride and other products. The aluminum fluoride generated by the reaction can clad the surface of the inner layer and prevent the unreacted hydrofluoric acid from contacting with the lithium manganate matrix, thereby avoiding the case where the lithium manganate matrix is corroded by the hydrafluoric acid.

In the present application, by providing an inner layer to consume the hydrofluoric acid entering the inside of the lithium manganate positive electrode active material, on the one hand, the corrosion of the lithium manganate matrix by the hydrofluoric acid can be avoided, and the lithium manganate matrix can be prevented from dissolving out more manganese ions, thereby reducing the manganese ions migrating to the negative electrode, thereby reducing the decomposition of the SEI film, thereby reducing, the consumption of the active lithium and the electrolyte solution, and thus improving the cycling capacity retention rate and rate performance of the battery; and on the other hand, the metal fluoride generated by the reaction can also block the contact between the hydrofluoric acid and the lithium manganate matrix, and thereby blocking the contact between the lithium manganate substrate and the hydrofluoric acid; also because of the good conductivity of the metal fluoride, the lithium ion transport within the entire lithium manganate positive electrode active material can be accelerated, thus comprehensively improving the cycling performance and rate performance of the battery.

A second aspect of the present application provides a lithium manganate positive electrode active material comprising a lithium manganate matrix and a cladding layer, wherein the cladding layer comprises an inner layer provided on the surface of the lithium manganate matrix, an interlayer provided on the surface of the inner layer, and an outer layer provided on the surface of the interlayer, wherein the inner layer comprises one or more of fluorides of aluminum, calcium and/or magnesium; the interlayer is an organic bonding material layer; and the outer layer is an oxalate and/or silicate layer.

In some embodiments, optionally the fluoride is one or more of aluminum fluoride, calcium fluoride, and magnesium flouride.

The lithium manganate positive electrode active material of the second aspect of the present application is the same as the lithium manganate positive electrode active material described in the first aspect of the present application, except that in the effective ingredients of the inner layer, the oxyacid salt of aluminum, calcium and/or magnesium is replaced with a fluoride comprising aluminum, calcium and/or magnesium; and comparing the lithium manganate positive electrode active material of the second aspect of the present application with the lithium manganate positive electrode active material of the first aspect, its cladding layer likewise has the functions of "barrier layer" and "functional layer", thereby improving the cycling capacity retention rate and rate performance of the battery.

In some embodiments, optionally the organic bonding material is selected from one or more of carboxymethyl cellulose salt, alginate salt, and polyacrylate salt, and optionally is one or more of sodium carboxymethyl cellulose, potassium carboxymethyl cellulose, lithium carboxymethyl cellulose, sodium alginate, potassium alginate, lithium alginate, magnesium alginate, aluminum alginate, sodium polyacrylate, potassium polyacrylate, and magnesium polyacrylate.

The interlayer of the lithium manganate positive electrode active material of the present application is an organic bonding material layer. For a lithium-ion battery, the electrolyte solution is generally composed of an organic solvent with various dissolved electrolytes that facilitate the battery performance. In an organic system, oxalates and silicates are generally insoluble or hardly soluble in electrolyte solution, and therefore when an oxalate or a silicate is directly added to an electrolyte solution or directly added to a positive electrode slurry dissolved by an organic solvent, there are problems of uneven mixing, incomplete and uneven contact with transition metal ions and fluoride ions, which significantly reduces the beneficial effects; therefore, it is difficult to effectively add oxalates and silicates into battery systems in practical industrial production processes. For this reason, in the present application, an oxalate capable of capturing manganese ions in the electrolyte solution and a silicate consuming hydrofluoric acid are creatively added to the positive electrode active material, thus avoiding the abovementioned problem of insolubility in the electrolyte solution.

On the one hand, the organic bonding material layer (i.e., the interlayer) of the present application functions to bond, adhering to the inner layer (fluoride of aluminum, calcium and/or magnesium) and bonding the outer layer (bonding oxalate and silicate to the organic bonding material layer), thereby stabilizing the three-layer cladding structure of the lithium manganate positive electrode active material of the present application; and on the other hand, some organic bonding materials such as carboxymethyl cellulose salt, alginate salt, polyacrylate salt and the like also contain functional groups for bonding $Mn^{2+}$, and thus also function to reduce $Mn^{2+}$ in the battery system.

In some embodiments, optionally the oxalate is selected from an alkali metal salt, an alkaline earth metal salt or an ammonium salt of oxalic acid, optionally is one or more of potassium oxalate, lithium oxalate, magnesium oxalate, and sodium oxalate, and more optionally is one or more of potassium oxalate, lithium oxalate, and sodium oxalate;

The outer layer of the lithium manganate positive electrode active material of the present application is an oxalate and/or silicate layer. The silicate can capture fluoride ions produced by the electrolyte solution, thereby reducing the amount of hydrofluoric acid, slowing down the corrosive decomposition of lithium manganate by the hydrofluoric acid, and reducing the amount of $Mn^{2+}$ present in the battery system.

Extensive experimentation and research by the inventors show that there are two mechanisms of action by which the silicate consumes the hydrofluoric acid to avoid the generation of manganese ions as follows: first, the silicate decomposes with the electrolyte solution to produce silicic acid, which reacts with hydrofluoric acid as follows: $H_2SiO_3+4HF \rightarrow SiF_4+3H_2O$; and secondly, the $(-O-Si)_2=O$ group in the silicate is capable of adsorbing fluoride ions in the electrolyte solution. Therefore, the silicate in the cladding layer can reduce the content of hydrofluoric acid contained in the electrolyte solution, and avoid the generation of transition metal manganese ions due to the corrosion of the lithium manganate matrix by the hydrofluoric acid.

The outer layer of the lithium manganate positive electrode active material of the present application further comprises an oxalate. Within a battery containing transition metal $Mn^{2+}$, the oxalate dissolved in the electrolyte solution ionizes to generate $C_2O_4^{2-}$ groups, and in comparison to alkali metal ions such as $Na^+$, $K^+$ etc., the $C_2O_4^{2-}$ groups generated by ionization preferentially bond with free $Mn^{2+}$ in the electrolyte solution, thereby reducing or even eliminating $Mn^{2+}$.

It can be seen therefrom that the cladding layer of the present application significantly reduces the content of transition metal $Mn^{2+}$ inside the battery through the combined action of the inner layer, the interlayer and the outer layer, thereby significantly reducing the amount of generated metallic manganese that "catalyzes" the decomposition of the SEI film, thus slowing down the decomposition loss of the SEI film on the surface of the negative electrode by the transition metal manganese, thereby reducing the consumption of active lithium due to the formation of new SEI film, thus increasing the content of the active lithium actually contributing to charge and discharge, and finally improving the battery capacity retention rate after multiple charge-discharge cycles; secondly, under the action of the modified lithium manganate positive electrode active material described above, the decomposition of the SEI film by the transition metal is significantly slowed down, so the by-products generated by the decomposition of the SEI film are also significantly reduced, thus avoiding the deposition of a large amount of by-products on the surface of the negative electrode, reducing the resistance to lithium ions in and out of the negative electrode, thereby reducing the battery impedance, which is beneficial to improving the rate performance of the battery, and at the same time, under the action of the modified lithium manganate material described above, the decomposition rate of the SEI film is significantly reduced, so the consumption of electrolyte in the electrolyte solution is also significantly reduced, and the effect of maintaining the conductivity of the electrolyte solution is better. To sum up, in comparison to the conventional lithium manganate material, the lithium manganate positive electrode active material of the present application can comprehensively improve the cycling capacity retention rate and the rate performance of the battery.

In some embodiments, optionally the inner layer may completely clad the lithium manganate matrix, or may partially clad the lithium manganate matrix, depending on the amount of material used in the inner layer; similarly, whether the interlayer completely clads the inner layer or not depends largely on the amount of the organic bonding material used, and When the mass ratio of the organic bonding material to the lithium manganate matrix is 1:100 or more, complete cladding can be achieved substantially; and similarly, whether the outer layer completely clads the interlayer or not depends largely on the amount of oxalate and/or silicate used. Proper cladding facilitates the optimization of the overall efficacy of the cladding layer; however, over-cladding may affect the rate performance of the lithium-ion battery.

In some embodiments, optionally the mass ratio of the inner layer to the lithium manganate matrix is 0.01-3:100, and optionally is 1-2:100.

In the lithium manganate positive electrode active material of the present application, on the one hand, a suitable mass ratio of the inner layer to the lithium manganate matrix helps the inner layer to closely and uniformly clad the lithium manganate matrix, sufficiently blocking the entry of the hydrofluoric acid into the lithium manganate matrix, thereby avoiding the decrease of the battery cycling performance caused thereby, and on the other hand, the inner layer can be maintained to contain a suitable amount of effective ingredients (oxyacid salts or fluorides of aluminum, calcium and/or magnesium) consuming the hydrofluoric acid, thereby improving the cycling performance of the battery, while not making the thick mess of the inner layer too large to deteriorate the rate performance of the battery.

Optionally, the mass ratio of the inner layer to the lithium manganate matrix is 0.01:100, 0.5:100, 1:100, 1.5:100, 2:100, 3:100, or a value within a range obtained by combining any two of the above values.

In some embodiments, optionally the mass ratio of the interlayer to the lithium manganate matrix is 0.5-3:100, more optionally is 1-2:100.

As described above, a suitable amount of the organic bonding material is crucial to the establishment of beneficial functions of the lithium manganate of the present application. In addition, through extensive experimentation, the inventors have found that:

When the content of the organic bonding material in the cladding layer is too low, sufficient bonding effect cannot be achieved; on the ogre hand, the effective components in the inner layer cannot be firmly fixed on the surface of the lithium manganate matrix, and on the other hand, the effective components in the outer layer cannot be closely bonded, which results in the reduction of the bonding function of the organic bonding material and even the failure of the function of the cladding layer. In contrast, when the content of the organic bonding material in the cladding layer is too high, the cladding layer may be too thick, which hinders the transport of lithium ions in the lithium manganate positive electrode active material, so that lithium ions are not easily released or intercalated, resulting in a lower battery charging rate. Whereas a suitable amount of the organic bonding material can: on the one hand, sufficiently stabilize the three-layer cladding structure of the cladding layer, and maintain the stability of the structure during multiple charge-discharge processes of the battery; on another hand, ensure that the effective components (oxyacid salts or fluorides of aluminum, calcium and/or magnesium; organic bonding materials; and oxalates and/or silicates) within the cladding layer function well to capture the manganese ions or the hydrofluoric acid; and on the other hand, also ensure that the charging rate is good.

Optionally, the mass ratio of the interlayer to the lithium manganate matrix may be 0.5:100, 1:100, 1.5:100, 2:100, 3:100, or a value within a range obtained by combining any two of the above values.

In some embodiments, optionally the mass ratio of the outer layer to the lithium manganate matrix is 0.5-12:100, and optionally is 0.5-6:100.

In the lithium manganate positive electrode active material of the present application, a suitable mass ratio of the outer layer to the lithium manganate matrix is beneficial to fully capture the transition metal ions inside the battery and the fluoride ions in the electrolyte solution, thereby reducing the generation of manganese ions, avoiding the migration of manganese ions to the negative electrode, thereby reducing the loss of the SEI film by the transition metal manganese, thereby significantly reducing the consumption of the active lithium and the electrolyte solution, and improving the cycling capacity retention rate and the rate performance of the battery.

When the content of oxalate and/or silicate in the cladding layer is too low, it results in that the outer layer cannot provide sufficient groups for capturing fluoride ions and transition metal ions, and the improvement of the electrical performance of the battery is not much. In contrast, when the content of oxalate and/or silicate in the cladding layer is too high, since the outer layer contains no active lithium ions, the gram capacity of the lithium manganate positive electrode active material is decreased, that is, the mass proportion of effective lithium manganate in the lithium manganate positive electrode active material with the same mass is decreased, thus the theoretical gram capacity thereof is lost, whereas the cycling performance is reduced.

Optionally, the mass ratio of the outer layer to the lithium manganate matrix may be 0.5:100, 1:100, 3:100, 6:100, 12:100, or a value within a range obtained by combining any two of the above values.

In some embodiments, optionally the mass ratio of the inner layer:interlayer:outer layer is 0.01-3:0.5-3:0.5-12, and optionally is 1-2:1-2:0.5-6, i.e. 1:0.5:0.25-6.

In the lithium manganate positive electrode active material of the present application, a suitable mass ratio of the inner layer, the interlayer and the outer layer can ensure that the cladding layer functions well as a whole and optimize the structure of the cladding layer. On the one hand, the synergistic action of the three layers can make the cladding layer function well as the "barrier", and on the other hand, the transition metal manganese ions already produced inside the battery can be reduced through chemical reactions or adsorption effects. In addition, a suitable mass ratio of the inner layer, the interlayer, and the outer layer can ensure the function of the cladding layer while avoiding the adverse effects on the impedance performance of the battery due to the excessive thickness of the cladding layer.

In some embodiments, optionally the mass ratio of the oxalate to the silicate is 0.01-99:1, optionally is 0.1-9:1, and more optionally is 0.25-4:1.

In the lithium manganate positive electrode active material of the present application, the silicate is used for capturing fluoride ions in the electrolyte solution, thereby slowing down the precipitation of transition metal manganese ions caused by the corrosion of the lithium manganate matrix by hydrofluoric acid; and the oxalate is used for directly capturing the transition metal manganese ions inside the battery. The combined use of oxalate and silicate has the best effect. When the ratio of the mass of oxalate to the mass of silicate is too low, indicating that the mass of oxalate in the outer layer is too small, the capture rate of the cladding layer for the transition metal manganese ions inside the battery decreases; and in contrast, when the ratio of the mass of oxalate to the mass of silicate is too high, indicating that the amount of silicate in the outer layer is too small, the fluoride ions in the electrolyte solution are not sufficiently captured, and the erosion effect on the surface of the lithium manganate positive electrode active material is enhanced. Therefore, if the ratio is too high or too low, more transition metal manganese ions migrate to the negative electrode and are reduced to metallic manganese, eventually affecting the cycling capacity retention rate and the rate performance of the battery.

Optionally, the ratio of the mass of oxalate to the mass of silicate may be 0.01:1, 0.1:1, 0.25: 1, 0.43:1, 4.67:1, 2.3:1, 4:1, 9:1, 99:1, or a value within a range obtained by combining any two of the above values.

In some embodiments, optionally the lithium manganate positive electrode active material has a multi-level pore structure with an average pore size of 15-20 nm and a porosity of 10-20%.

The lithium manganate positive electrode active material of the present application has a multi-level pore structure, and the multi-level pore structure is determined by the pore structure of the lithium manganate substrate itself and the pore-forming treatment to the organic bonding material layer of the interlayer in the present application. The lithium manganate positive electrode active material with a multi-level pore structure is beneficial to shorten the transport path of lithium ions inside the positive electrode active material, thereby ensuring that it is resistant to hydrofluoric acid and captures manganese ions while improving the battery performances of reduced impedance and fast Charging.

Optionally, the lithium manganate positive electrode active material may have an average pore size of 15 mm, 18 nm, 19 nm or 20 nm and a porosity of 13%, 18%, 19% or 20%.

In some embodiments, optionally the interlayer has a rough surface obtained by hydrochloric acid etching.

In the positive electrode active material of the present application, the rough surface of the interlayer increases the adhesion area of oxalate and/or silicate on the one hand, and provides a larger space for the adhesion thereof, thereby facilitating sufficient adhesion of a greater amount of oxalate and silicate, and reducing the difficulty of adhesion, so that the outer layer closely adheres to the surface of the interlayer.

In some embodiments, optionally the lithium manganate positive electrode active material has a volume average particle size D50 of 12-14 μm.

In the lithium manganate positive electrode active material of the present application, when the particle size is too large, the transport path of lithium ions in the positive electrode active material particles increases, the battery impedance increases, which is not advantageous for the processing of the electrode sheet. Through experimental verification, when the particle size thereof is in the range of 12-14 μm, the corresponding battery has better electrical performances.

Based on independent particles, the lithium manganate matrix itself can be of a primary particle or a secondary particle (i.e., agglomerated primary particles).

In some embodiments, optionally the cladding layer has a thickness of 0.3-5.2 μm, optionally 0.7-2.0 μm, more optionally 1.2-1.7 μm.

A suitable thickness of the overall cladding layer can sufficiently function to bond, and enough inner layer, interlayer and outer layer are bonded together, and closely bonded to the surface of the lithium manganate matrix. When the thickness of the cladding layer is too low, indicating that the content of various substances in the cladding layer, especially the content of the bonding material, is small, on the one hand, the bonding material can not closely bond to the inner layer, and on the other hand, it can not adhere enough oxalate and silicate, resulting, in the failure of the function of the cladding layer. In contrast, when the whole cladding layer is too thick, the transport of lithium ions in the lithium manganate positive electrode active material is hindered, so that lithium ions are not easily released or intercalated, resulting in a decrease in the cycling capacity retention rate of the battery on the one hand, and affecting the rate performance of the battery on the other hand.

The inventors have found through research that the thickness of each layer is substantially positively correlated with the amount of material used in each layer. In order to coordinate the functions of each layer better, in some embodiments, optionally the thickness of the inner layer is 0.02-0.2 μm, the thickness of the interlayer is 0.1-3 μm, and the thickness of the outer layer is 0.02-2 μm.

The lithium manganate positive electrode active material of the present application has better mechanical properties, and after being prepared into a positive electrode sheet or a lithium-ion battery, the structure of the lithium manganate positive electrode active material is well maintained, the thickness of the cladding layer has no obvious change, and there is substantially no shedding of the inner layer or the interlayer or the outer layer.

In an embodiment of the present application, there is provided a method for preparing a lithium manganate positive electrode active material, comprising:

ball-milling one or more of oxyacid salts of aluminum, calcium and/or magnesium with a lithium manganate matrix to obtain a first intermediate, wherein the first intermediate utilizes the manganate matrix as a substrate, and the surface of the lithium manganate matrix is cladded with the oxyacid salts of aluminum, calcium and/or magnesium;

preparing an organic bonding material slurry, and coating the organic bonding material slurry on the surface of the first intermediate to obtain a second intermediate;

preparing an oxalate and/or silicate slurry, and coating the oxalate and/or silicate on the surface of the second intermediate to obtain the lithium manganate positive electrode active material; wherein, the lithium manganate positive electrode active material comprises a lithium manganate matrix and a cladding layer, wherein the cladding layer comprises an inner layer provided on the surface of the lithium manganate matrix, an interlayer provided on the surface of the inner layer, and an outer layer provided on the surface of the interlayer, wherein the inner layer comprises one or more of oxyacid salts of aluminum calcium and/or magnesium, the interlayer is an organic bonding material layer, and the outer layer is an oxalate and/or silicate layer.

Specifically, when the surface of the lithium manganate matrix is claded with the inner layer (i.e., the oxyacid salt of aluminum, calcium and/or magnesium), based on 100 parts by mass of lithium manganate, the oxyacid salt of aluminum, calcium and/or magnesium is used in an amount of 0.01-3 parts by mass, optionally is 0.5-2 parts by mass, and more optionally 0.5-1.5 parts by mass.

When the organic bonding material layer is cladded, based on 100 parts by mass of lithium manganate, 0.01-5 parts by mass of the organic bonding material and 1-500 parts by mass of deionized water (the ratio of the organic bonding material to the deionized water is 1:100) are mixed by stirring to obtain an organic bonding material slurry.

When the outer layer (i.e., oxalate, silicate) is cladded, based on 100 parts by mass of lithium manganate, 0.01-3 parts by mass of the oxalate and/or silicate and 1-300 parts by mass of deionized water (the ratio of the sum of the oxalate and/or silicate to the deionized water is 1:100) are mixed by stirring to obtain an oxalate and/or silicate coating slurry. Wherein the mass ratio of the oxalate to the silicate is 0.01-99:1, optionally is 0.1-9:1, more optionally is 0.25-4:1.

Specifically, in the above steps, the stirring temperature is 20-40° C., the rotational speed of stirring, is 100-150 rpm, and the stilling time is 30-60 min.

Specifically, in the above steps, the oven drying can be selected as stirring while oven drying, the oven drying temperature is 50-230° C., and the oven drying time is 1-6 h. The temperature and time for oven drying should be sufficient for the purposes of the present application, e.g. when no pore-forming agent is used, the temperature and time for oven drying should be sufficient to remove moisture from the material. When a pore-forming agent is used, the temperature and time for oven drying should also be sufficient to remove the pore-forming agent contained in the material, thereby achieving the purpose of providing a porous structure in the interlayer.

In some embodiments, optionally based on the weight of the lithium manganate matrix, the organic bonding material shiny further comprises 1-3 wt % of a pore-forming agent, and the pore-forming agent is removed by applying a predetermined temperature to the second intermediate. The "predetermined temperature" here refers to a temperature sufficient to remove the pore-forming agent without adversely affecting the material, and the specific temperature depends on the volatilization temperatures of the different pore-forming agents.

In the present application, in order for the oxalate and silicate to adhere more easily to the surface of the interlayer, a porous structure may optionally be provided on the surface of the interlayer. The porous structure can be provided using a method commonly known to those skilled in the art for pore-forming, for example, by a templating method, a nano-etching method, a pore-forming agent method, a self-assembly method, and the like. The pore-forming agent method is preferably used for pore-forming in the present application. The pore-forming agent may be one commonly known in the art for pore-forming, and may be, for example, polyvinylpyrrolidone, ammonium bicarbonate, ammonium carbonate, and the like, and ammonium carbonate is preferred.

In addition, the inventors have found through research that by providing a porous structure on the surface of the interlayer, the reduction of the rate performance of the battery due to the cladding on the surface of the lithium manganate matrix can be alleviated, possibly because that the porous structure reduces the surface tension of the positive electrode active material and shortens the passage of lithium ions in and out of the positive electrode material, which is more favorable for lithium ion transport, and thus is more favorable for lithium ion deintercalation on the positive electrode material.

An appropriate amount of pore-forming agent is helpful for achieving the above purposes of the present application. When the amount of pore-forming agent used is less, the pore channel structure in the interlayer is insufficient, the advantages of the pore channel structure can not be effectively exerted; avid when the amount of pore-forming agent used is excessive, the basic structure of the interlayer may be damaged, and the beneficial effect of the interlayer closely bonding the inner layer and the outer layer cannot be exerted.

In some embodiments, optionally before cladding oxalate and/or silicate, the product with the interlayer cladded (i.e., the organic bonding material layer) is added to a hydrochloric acid solution, stirred for 40-120 min, filtered and then oven dried.

In order for the oxalate and silicate to more easily adhere to the interlayer, it is necessary to roughen part of the interlayer, and the surface of the interlayer can be roughened by a method commonly known in the art. By way of example, the surface of the interlayer can be treated by chemical methods, for example, the surface of the interlayer can be etched using an acidic solution with a certain concentration. By way of example, a hydrochloric acid solution with a concentration of 0.001 mol/L is used in the present application to etch the surface of the interlayer.

The roughening treatment can increase the specific surface and the concavo-convex surface of the interlayer, which has the following effective effects: 1. the oxalate and silicate adhere more easily to the interlayer, thus better exerting the effects of capturing manganese ions and consuming hydrofluoric acid: 2. the contact area between the lithium manganate matrix and the electrolyte solution is increased, thus providing more active sites for lithium ion deintercalation; the above-mentioned beneficial effects can comprehensively improve the cycling performance and rate performance of the battery.

Optionally, the etching time is 40-120 min. When the etching time is too short, the roughening treatment effect is not obvious; and when the etching time is too long, the structure of the interlayer may be damaged, and even the effective components of the inner layer may be lost.

Positive Electrode Sheet

The present application provides a positive electrode sheet comprising the lithium manganate positive electrode active material of the first aspect of the present application.

In some embodiments, optionally the positive electrode sheet further comprises an ternary NCM (nickel-cobalt-manganese) material, and the mass ratio of the ternary NCM (nickel-cobalt-manganese) material to the lithium manganate positive electrode active material is 0.01-99:1.

Currently, when pure lithium manganate is used as positive electrode active material for lithium-ion batteries, the corresponding lithium-ion battery has poor electrical properties, especially poor energy density, and thus a ternary NCM (nickel-cobalt-manganese) material is generally used in combination. The combined use of lithium manganate and ternary NCM material has the following beneficial effects: reducing the cost of using ternary NCM (nickel-cobalt-manganese) material alone; improving battery stability and safety; solving the problem that it is difficult to manage and control the BMS (Battery Management System) platform due to the voltage platform mismatch between manganate and ternary NCM material; in addition, the surface of the ternary NCM (nickel-cobalt-manganese) material contains alkaline residual lithium, which can neutralize part of the hydrofluoric acid in the electrolyte solution.

The positive electrode sheet includes a positive electrode current collector and a positive electrode material provided on at least one surface of the positive electrode current collector. By way of example, the positive electrode current collector has two opposite surfaces in the direction of its own thickness, and the positive electrode material is provided on either or both of the two opposite surfaces of the positive electrode current collector.

In the lithium-ion secondary battery of the present application, the positive electrode current collector can be a metal foil or a composite current collector. For example, as the metal foil, an aluminum foil can be used. The composite current collector may include a high molecular material base layer and a metal layer formed on at least one surface of the high molecular material base layer. The composite current collector can be formed by forming the metal material (aluminum, aluminum alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), 1,3-propane sultone (PS), polyethylene (PE), etc.), although the present application is not limited to these materials.

The positive electrode material further optionally comprises a conductive agent. However, the type of the conductive agent is not particularly limited, and those skilled in the art can make a selection according to actual needs. By way of example, the conductive agent for the positive electrode material can be selected from one or more of superconducting carbon, acetylene black, carbon black, Ketjen black, carbon dot, carbon nanotube, graphene, and carbon nanofiber.

The positive electrode sheet in the present application can be prepared according to the methods known in the art. By way of example, the positive electrode active material, the conductive agent and the binder of the present application can be dispersed in a solvent (for example, N-methyl pyrrolidone (NMP)) to form a uniform positive electrode slurry; the positive electrode slurry is coated on the positive electrode current collector, and after oven drying, cold pressing and other procedures, the positive electrode sheet is obtained.

Negative Electrode Sheet

The negative electrode sheet includes a negative electrode current collector and a negative electrode film layer provided on at least one surface of the negative electrode current collector, wherein the negative electrode film layer comprises a negative electrode active material.

By way of example, the negative electrode current collector has two opposite surfaces in the direction of its own thickness, and the negative electrode film layer is provided on either or both of the two opposite surfaces of the negative electrode current collector.

In the lithium-ion secondary battery of the present application, the negative electrode current collector can be a metal foil or a composite current collector. For example, as the metal foil, a copper foil can be used. The composite current collector may include a high molecular material base layer and a metal layer formed on at least one surface of the high molecular material base layer. The composite current collector can be formed by forming the metal material (copper, copper alloy, nickel, nickel alloy, titanium, titanium alloy, silver and silver alloy, etc.) on the high molecular material substrate (such substrate as polypropylene (PP), polyethylene terephthalate (PET), polybutylene terephthalate (PBT), polystyrene (PS), polyethylene (PE), etc.), although the present application is not limited to these materials.

In the negative electrode sheet of the present application, the negative electrode film layer generally comprises a negative electrode active material and an optional binder, an optional conductive agent and other optional auxiliaries, and is usually formed by coating a negative electrode slurry and drying. The negative electrode shiny is generally formed by dispersing the negative electrode active material as well as the optional conductive agent and the binder, etc. in a solvent and uniformly stirring. The solvent may be N-methyl pyrrolidone (NMP) or deionized water.

By way of example, the conductive agent can be selected from one or more of superconducting carbon, acetylene black, carbon black, Ketjen black, carbon dot, carbon nanotube, graphene, and carbon nanofiber.

In the negative electrode sheet of the present application, in addition to the negative electrode active material, the negative electrode film layer optionally may also comprise other common negative electrode active materials, for example, as the other common negative electrode active materials, artificial graphite, natural graphite, soft carbon, hard carbon, silicon matrix material, tin matrix material, lithium titanate and the like can be cited. The silicon matrix material can be selected from one or more of elemental silicon, silicon-oxygen compound, silicon-carbon composite, silicon-nitrogen composite, and silicon alloy. The tin matrix material can be selected from one or more of elemental tin, tin-oxygen compound, and tin alloy.

Electrolyte

The electrolyte serves to conduct ions between the positive electrode sheet and the negative electrode sheet. The type of the electrolyte is not particularly limited in the present application, and can be selected according to needs. For example, the electrolyte can be selected from at least one of solid electrolyte and liquid electrolyte (i.e., electrolyte solution).

In some embodiments, an electrolyte solution is employed as the electrolyte. The electrolyte solution comprises an electrolyte salt and a solvent.

In some embodiments, the electrolyte salt can be selected from one or more of lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalate)borate (LiBOB), lithium difluorophosphate (LiPO$_2$F$_2$), lithium difluoro bis(oxalato)phosphate (LiDFOP), and lithium tetrafluoro(oxalato)phosphate (LiTFOP).

In some embodiments, the solvent can be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (EEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl stilfone (EMS) and diethyl sulfone (ESE).

In some embodiments, the electrolyte solution optionally further comprises an additive. For example, the additive may include a negative electrode film-forming additive, may also include a positive electrode film-forming additive, and may further include an additive capable of improving certain properties of the battery, such as an additive for improving the overcharging performance of the battery, an additive for improving, the high temperature performance of the battery, and an additive for improving the low temperature performance of the battery, etc.

Separator

Lithium ion secondary batteries employing electrolyte solutions as well as some lithium ion secondary batteries employing solid electrolytes also include separators. A separator is provided between the positive electrode sheet and the negative electrode sheet, and functions to separate. The type of the separator is not particularly limited in the present application, and any well-known separator with a porous structure having good chemical stability and mechanical stability may be selected. In some embodiments, the material of the separator can be selected from one or more of glass fiber, non-woven cloth, polyethylene, polypropylene, and polyvinylidene fluoride. The separator may be a single-layer film or a multi-layer composite film, and is not particularly limited. When the separator is a multi-layer composite film, the materials of each layer may be the same or different, and there is no particular limitation.

Lithium Ion Secondary Battery

In some embodiments, the positive electrode sheet, the negative electrode sheet, and the separator can be made into an electrode assembly by a winding process or a lamination process.

In some embodiments, the secondary battery of the present application is a lithium ion secondary battery.

In some embodiments, the lithiumion secondary battery can include an outer package. The outer package can be used to encapsulate the above-mentioned electrode assembly and electrolyte.

In some embodiments, the outer package of the lithium-ion secondary battery can be a hard case, such as a hard plastic case, an aluminum case, a steel case, and the like. The outer package of the lithium-ion secondary battery can also be a soft pack, such as a bag-type soft pack. The material of the soft pack can be a plastic, and examples as plastics include polypropylene (PP), polybutylene terephthalate (PBT) and polybutylene succinate (PBS).

The shape of the lithium-ion secondary battery is not particularly limited in the present application, and may be cylindrical, square or of any other shapes. For example, FIG. 6 is an example of lithium-ion battery 5 having a square structure.

Figure 6:
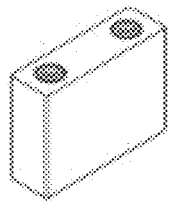
FIG. 6 is a schematic diagram of a lithium-ion battery according to an embodiment of the present application.
Figure 7:
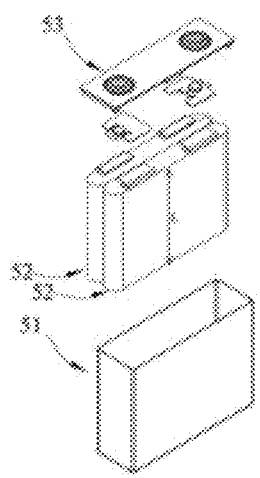
FIG. 7 is an exploded view of the lithium-ion battery according to the embodiment of the present application shown in FIG. 6.

In some embodiments, FIG. 7 is an exploded view of the lithium-ion battery according to the embodiment of the present application shown in FIG. 6, and the outer package can include a case 51 and a cover plate 53. Here, the case 51 can include a bottom plate and a side plate connected to the bottom plate, with the bottom plate and the side plate enclosing to form an accommodating cavity. The case 51 has an opening that communicates with the accommodating cavity, and the cover plate 53 can cover the opening to close the accommodating cavity. The positive electrode sheet, the negative electrode sheet, and the separator may form an electrode assembly 52 by a winding process or a lamination process. The electrode assembly 52 is encapsulated within the accommodating cavity. The electrolyte solution impregnates the electrode assembly 52. The number of electrode assemblies 52 contained in the lithium-ion battery 5 can be one or more, and can be selected by those skilled in the art according, to specific needs.

Battery Module

In some embodiments, lithium-ion secondary batteries can be assembled into a battery module, the number of lithium-ion batteries contained in the battery module can be one or more, and the specific number can be selected by those skilled in the art according to the application and capacity of the battery module.

Figure 8:
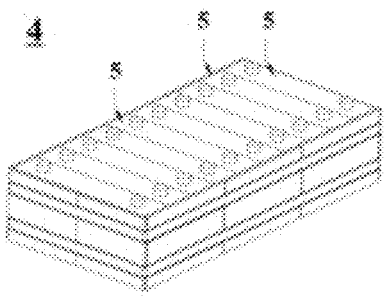
FIG. 8 is a schematic diagram of a battery module according to an embodiment of the present application.

FIG. 8 is an example of battery module 4. Referring to FIG. 8, in the battery module 4, a plurality of lithium-ion batteries 5 can be sequentially arranged along the length direction of the battery module 4. Of course, any other arrangement is also possible. The plurality of lithium-ion batteries 5 may further be fixed by fasteners.

Optionally, the battery module 4 can also include a housing having an accommodating space, in which the plurality of lithium-ion batteries 5 are accommodated.

Battery Pack

In some embodiments, the above-mentioned battery modules can also be assembled into a battery pack, and the number of battery modules contained in the battery pack can be selected by those skilled in the art according to the application and capacity of the battery pack.

Figure 9:
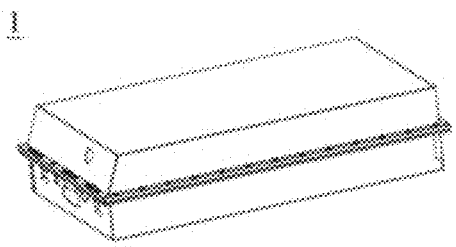
FIG. 9 is a schematic diagram of a battery pack according to an embodiment of the present application.
Figure 10:
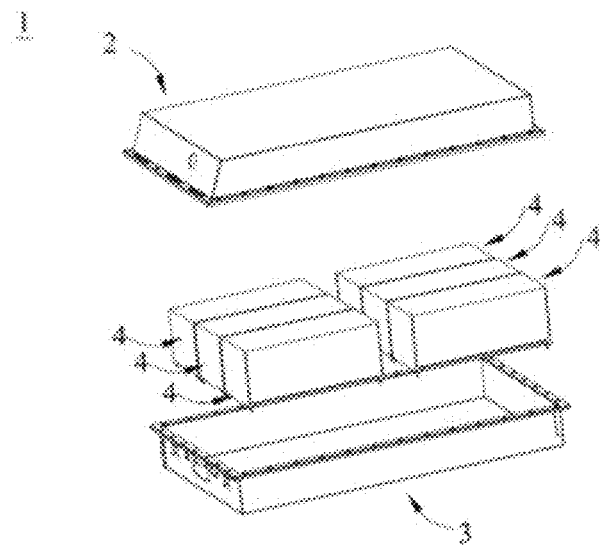
FIG. 10 is an exploded view of the battery pack according to the embodiment of the present application shown in FIG. 9.

FIGS. 9 and 10 are an example of battery pack 1. Referring to FIGS. 9 and 10, the battery pack 1 can include a battery box and a plurality of battery modules 4 provided in the battery box. The battery box includes an upper box 2 and a lower box 3, wherein the upper box 2 can cover the lower box 3, and forms an enclosed space for accommodating the battery module 4. The plurality of battery modules 4 may be distributed in the battery box according to any manner.

Powered Device

In addition, the present application further provides a powered device, and the powered device includes one or more of the lithium-ion battery, the battery module, or the battery pack provided by the present application. The lithium-ion battery, the battery module or the battery pack may be used as a power source of the device or an energy storage unit of the device. The device may be but is not limited to a mobile device (such as a mobile phone, a laptop, etc.), an electric vehicle (such as an all-electric vehicle, a hybrid electric vehicle, a plug-in hybrid electric vehicle, an electric bicycle, an electric scooter, an electric golf cart, an electric truck, etc.), an electric train, a ship, a satellite, an energy storage system, etc.

The lithium-ion battery, the battery module, or the battery pack can be selected as the powered device according to use requirements.

Figure 11:
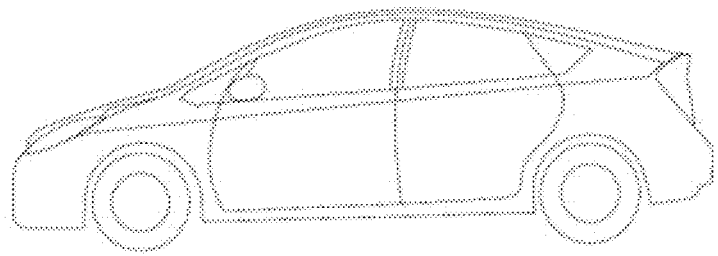
FIG. 11 is a schematic diagram of a powered device according to an embodiment of the present application.

FIG. 11 is an example of device. The device is a all-electric vehicle, a hybrid electric vehicle, or a plug-in hybrid electric vehicle, etc. In order to meet the requirements of the device for high power and high energy density of lithium-ion batteries, the battery pack of the battery module may be adopted.

A device as another instance may be a mobile phone, a tablet computer, a laptop, etc. The device is typically required to be thin, and the lithium-ion battery may be adopted as a power source.

EXAMPLES

Examples of the present application are illustrated below. The examples described below are illustrative, are merely used to explain the present application, and should not be construed as a limitation to the present application. Where specific techniques or conditions are not specified in the examples, the techniques or conditions described in the literatures of the art or the product specifications are followed. Where manufacturers are not specified, the reagents or instruments used are conventional products commonly used in the art and are commercially available. if not specified, the content of each ingredient in the examples of the present application is based on the dry weight without water of crystallization.

The raw material sources involved in the examples of the present application are as follows:

Lithium manganate ($LiMn_2O_4$, Tianjin Guoan Mengguli New Materials Science & Technology Co., Ltd.)

Nickel-cobalt-manganese ($LiMO_2$, M is Ni—Co—Mn solid solution, and the mass ratio thereof is 55:12:33)

Potassium tetrafluoroaluminate ($KAlF_4$, CAS:13775-52-5, Shanghai Macklin Biochemical Co., Ltd.)

Potassium aluminate ($K_2Al_2O_4$, CAS:12003-63-3, Shanghai Macklin Biochemical Co., Ltd.)

Aluminum fluoride ($AlF_3$, CAS:7784-18-1, Shanghai Macklin Biochemical. Co., Ltd.)

Sodium carboxymethyl cellulose (CMC, CAS:9004-65-03 Shanghai Macklin Biochemical Co., Ltd.)

Sodium alginate (SA, CAS:9005-38-3, Shanghai Macklin Biochemical Co., Ltd.)

Sodium polyacrylate (PAAS, CAS:9003-04-7, Shanghai Macklin Biochemical Co., Ltd.)

Potassium silicate ($K_2SiO_3$, CAS:1312-76-1, Shanghai Macklin Biochemical Co., Ltd.)

Potassium oxalate ($K_2C_2O_4$, CAS:6487-48-5, Shanghai Macklin Biochemical Co., Ltd.)

Polyvinylpyrrolidone (PVP, CAS:9003-39-8, Shanghai Macklin Biochemical Co., Ltd.)

Hydrochloric acid (CAS: 7647-01-0, Specification≥31%, Nanjing Liante Chemical. Co., Ltd)

Conductive agent carbon black (CAS:1333-86-4, dotted carbon, Shanghai Macklin Biochemical Co., Ltd.)

Linear carbon black (CAS:308068-56-6, multi-wall carbon nanotube Shanghai Macklin Biochemical Co., Ltd.)

Polyvinylidene fluoride (PNIDF, CAS:24937-79-9, Shanghai Macklin Biochemical Co. Ltd.)

N-methyl pyrrolidone (NMP, CAS:872-50-4, Shanghai Macklin Biochemical Co. Ltd.)

Styrene butadiene rubber (SBR, CAS:9003-55-8, Shanghai Macklin Biochemical Co., Ltd.)

Ethylene carbonate (EC, CAS:96-49-1, Shanghai Macklin Biochemical Co., Ltd.)

Dimethyl carbonate (DMC, CAS:616-38-6, Shanghai Macklin Biochemical Co., Ltd.)

Example 1

Preparation of Lithium Manganate Positive Electrode Active Material 1) cladding inner layer: 100 g of lithium manganate matrix material (calculated as $LiMn_2O_4$, same below) and 1 g of potassium tetrafluoroaluminate (calculated as $KAlF_4$) were weighed and ball-milled such that the potassium tetrafluoroaluminate uniformly cladded the lithium manganate matrix to obtain a first intermediate. Ball milling parameters: ratio 15:1, rotational speed 800 rpm, ball milling time 120 min.

2) cladding interlayer: 0.5 g of sodium carboxymethyl cellulose was weighed and added to 50 g of deionized water, and stirred at a rotational speed of 80 rpm for 30 min at 25° C. to obtain a homogeneous colloidal solution. The first intermediate from step 1) was then added to the above colloidal solution and stirred at a rotational speed of 800 rpm for 120 min at 2.5° C. to ensure that the sodium carboxymethyl cellulose uniformly cladded the material. The resulting material was then oven dried at 80° C. for 1 h to remove moisture, ensuring that the sodium carboxymethyl cellulose closely cladded the surface of the material to obtain a second intermediate.

3) cladding outer layer:250 g of deionized water was measured out, and to it was added 2.5 g of potassium oxalate (calculated as $K2C_2O_4$) and 2.5 g of potassium silicate (calculated as $K_2SiO_3$), and stirred at a rotational speed of 800 rpm for 30 min at 25° C. to obtain a uniform cladding slurry. The second intermediate from step 2) was then added to the above cladding slurry, and stirred at a rotational speed of 804 rpm for 180 min at 25'C. The resulting material was then oven dried at 80° C. for 1 h to remove moisture, ensuring that the potassium oxalate and potassium silicate closely cladded the surface of the material to obtain the lithium manganate positive electrode active material of the present application.

Preparation of Positive Electrode Sheet

The prepared lithium manganate positive electrode active material, a ternary nickel-cobalt-manganese (NCM) material, a conductive agent carbon black, a binder polyvinylidene fluoride (PVDF) and N-methyl pyrrolidone (NMP) were mixed in a weight ratio of 67.34:28.86:2.7:1.1:30 and stirred uniformly to obtain a positive electrode slurry and then the positive electrode shiny was uniformly coated on the positive electrode current collector aluminum foil, dried, wound and pressed to obtain the positive electrode sheet.

Preparation of Negative Electrode Sheet

An artificial graphite, a conductive agent carbon black, a binder styrene butadiene rubber (SBR), a thickener sodium carboxymethyl cellulose (CMC) and deionized water were mixed in a weight ratio of 96.2:0.8:0.8:1.2:50, and after mixing uniformly, a negative electrode slurry was obtained; and then the negative electrode slurry was uniformly coated on the negative electrode current collector copper foil, dried, wound and pressed to obtain the negative electrode sheet.

Preparation of Electrolyte Solution

In a glove box in an argon atmosphere ($H_2O$<0.1 ppm, $O_2$<0.1 ppm), an organic solvent of ethylene carbonate (EC)/ethyl methyl carbonate (EMC) was mixed uniformly in a volume ratio of 3/7, 12.5% of lithium salt of $LiPF_6$ was added to dissolve in the organic solvent and stirred uniformly to obtain the electrolyte solution of Example 1.

Separator

A polypropylene film was used as the separator.

Preparation of Lithium-Ion Battery

The positive electrode sheet, the separator and the negative electrode sheet of Example 1 were stacked in sequence, so that the separator was positioned between the positive electrode sheet and the negative electrode sheet and functioned to separate, and then a bare battery cell was obtained by winding, a tab was welded to the bare battery cell, the bare battery cell was put into an aluminum case, baked at 80° C. to remove water, and then the electrolyte solution was injected, and an uncharged battery was obtained after sealing. The uncharged battery then went through procedures such as standing, hot and cold pressing, chemical formation, reshaping and capacity testing successively to obtain the lithium-ion battery product of Example 1.

Examples 2-7

Except that the sodium carboxymethyl cellulose was used in an amount of 1 g, 1.5 g, 2 g, 3 g, 0.007 g, and 5 g, respectively, the other steps were the same as those in Example 1.

Examples 8-14

Except that potassium aluminate was used instead of potassium tetrafluoroaluminate, sodium alginate was used instead of sodium carboxymethyl cellulose, and the total mass of the outer layer material was 0.005 g, 0.5 g, 1 g, 3 g, 6 g, 12 g, and 15 g, the other steps were the same as those in Example 1.

Examples 15-25

Except that potassium aluminate was used instead of potassium tetrafluoroaluminate, sodium polyacrylate was used instead of sodium carboxymethyl cellulose, and the amount of potassium oxalate (and correspondingly the amount of potassium silicate) used in the outer layer was tag (5 g), 0.05 g (4.95 g), 0.45 g (4.55 g (4 g), 1.5 g (3.5 g) 2 (3 g), 3.48 g (1.52 g), 4 g (1 g), 4.5 g (0.5 g), 4.95 g (0.05 g) and 4.955 g (0.045 g), the other steps were the same as those in Example 1.

Examples 26-33

Except that potassium aluminate was used instead of potassium tetrafluoroaluminate, sodium polyacrylate was used instead of sodium carboxymethyl cellulose, and the potassium aluminate was used in an amount of 0.004 g, 0.01 g, 0.5 g, 1 g, 1.5 g, 2 g, 3 g and 5 g, respectively, the other steps were the same as those in Example 1.

Example 34

Except that aluminum fluoride was used instead of potassium tetrafluoroaluminate, the other steps were the same as those in Example 1.

Example 35

Except that aluminum fluoride was used instead of potassium tetrafluoroaluminate, and sodium polyacrylate was used instead of sodium carboxymethyl cellulose, the other steps were the same as those in Example 1.

Example 36

Except that sodium polyacrylate was used instead of sodium carboxymethyl cellulose, the other steps were the same as those in Example 1.

Example 37

1) cladding inner layer: 100 g of lithium manganate matrix material (calculated as $LiMn_2O_4$, same below) and 1 g of potassium aluminate (calculated as $KAlF_4$) were weighed and ball-milled, such that the potassium aluminate uniformly cladded the lithium manganate matrix to obtain a first intermediate. Ball milling parameters:ratio 15:1, rotational speed 800 rpm, ball milling time 120 min.

2) cladding interlayer 0.5 g of sodium polyacrylate and 1 g of ammonium carbonate were weighed and added to 50 g of deionized water, and stirred at a rotational speed of 800 rpm for 30 min. at 25° C. to obtain a homogeneous colloidal solution. The first intermediate from step 1was then added to the above colloidal solution and stirred at a rotational speed of 800 rpm for 120 min at 25° C. to ensure that the sodium polyacrylate and ammonium carbonate uniformly cladded the material. The resulting material was then oven dried at 80° C. for 1 h to remove moisture and ammonium carbonate to obtain a second intermediate.

3) cladding outer layer: 250 g of deionized water was measured out, and to it was added 2.5 g of potassium oxalate (calculated as $K_2C_2O_4$) and 2.5 g of potassium silicate (calculated as $K_2SiO_3$), and stirred at a rotational speed of 800 rpm for 30 min at 25° C. to obtain a uniform cladding slurry. The second intermediate from step 2) was then added to the above cladding shiny, and stirred at a rotational speed of 80 rpm for 180 min at 25° C. The resulting material was then oven dried at 80° C. for 1 h to remove moisture, ensuring that the potassium oxalate and potassium silicate closely cladded the surface of the material to obtain the lithium manganate positive electrode active material of Example 37 of the present application.

Example 38

Except that 0.001 mol hydrochloric acid was used to etch the second intermediate of step 2) for 40 minutes, the other steps were the same as those in Example 36.

Example 39

Except that the etching time was changed from 40 minutes to 120 minutes, the other steps were the same as those in Example 38.

Comparative Example 1

An unmodified lithium manganate was used directly as a positive electrode active material, the lithium manganate an ternary NCM (nickel-cobalt-manganese) material, a conductive agent carbon black, a binder polyvinylidene fluoride (PVDF) and a solvent N-methyl pyrrolidone (NMP) were mixed in a weight ratio of 67.34:28.86:2.7:1.1:30 and thoroughly stirred uniformly to obtain a positive electrode slurry; and then the positive electrode slurry was uniformly coated on the positive electrode current collector, dried, wound and pressed to obtain the positive electrode sheet.

I. Test of the Relevant Parameters of Lithium Manganate Positive Electrode Active Material Relevant parameters of the lithium manganate positive electrode active materials of the Examples and Comparative example of the present application were tested as follows:

1. Volume Average Particle Size D50 Test

Equipment model:Melvin 2000 (MasterSizer 2000) Laser Particle Sizer, reference standard process: GB/T19077-2016/ISO 13320:2009, specific test process: taking an appropriate amount of the sample to be tested (the sample concentration should guarantee 8-12% shading degree), adding 20 ml of deionized water, at the same time, performing external ultrasonic treatment (ultrasonic treatment) for 5 min (53 KHz/120 W) to ensure that the sample was completely dispersed, and then testing the sample according to GB/T19077-2016/ISO 13320:2009 Standard.

2. Morphology Test

The lithium manganate positive electrode active materials of all Examples and Comparative example were tested using a ZEISS sigma 300 scanning electron microscope, and then tested according to the standard JY/T010-1996, and the morphology of the sample was observed.

It should be noted here that the shape of the lithium manganate matrix used in the present application was not necessarily spherical, and possibly irregular, and it might be a primary particle or a secondary particle. The D50 of the lithium manganate matrix used in the Examples was 12 μm. It should also be noted that the shape of the modified lithium manganate positive electrode active material prepared in the present application was not necessarily spherical, and possibly irregular.

3. Cladding Layer Thickness Test

Scissors were used to cut the electrode sheet before cold pressing into a sample with size of 6 cm*6 cm and then a IB-19500CP ion cross-section polisher was used to perform polishing treatment, and a polished sample with cut surface was obtained. The samples were then tested with the ZEISS sigma 300 equipment with reference to Standard JY/T010-1996. 10 different positions were randomly selected in the test sample for testing, and averaged to obtain the thickness of the cladding layer.

4. Average Pore Size and Porosity Test of Interlayer (Organic Bonding Material Layer)

An SSA-4000 series BET testing equipment was used to measure the pore size distribution of porous material by a nitrogen adsorption method at low temperature. The specific steps were as follows: 30 mg of the sample to be tested was put into a sample tube; the sample tube was installed in a degassing station, and when the sample tube was installing, the sample tube had to aligned with the port, screws were tightened to ensure the safety of sealing: then the sample tube was sheathed with a heating bag, the degassing temperature was adjusted, the vacuum pump was turned on to start heating and vacuum degassing the material, such that the adsorbed gas on the surface of the material was removed; at the end of degassing, the heating power source was turned off, and after the sample had cooled to room temperature, it was backfilled with helium, and after helium was filled to normal pressure, the sample tube was removed and immediately covered by a rubber stopper, weighed to 0.1 mg, and the weights of the helium-filled sample tube, stopper and filling rod were recorded. The weighed sample was installed in au analysis station, a liquid nitrogen was added into a Dewar flask, and the sample mass was input into an analysis file, test parameters were designed to perform the adsorption and desorption tests.

II. Battery Performance Test

1. Battery Capacity Retention Rate Test

Figure 4:
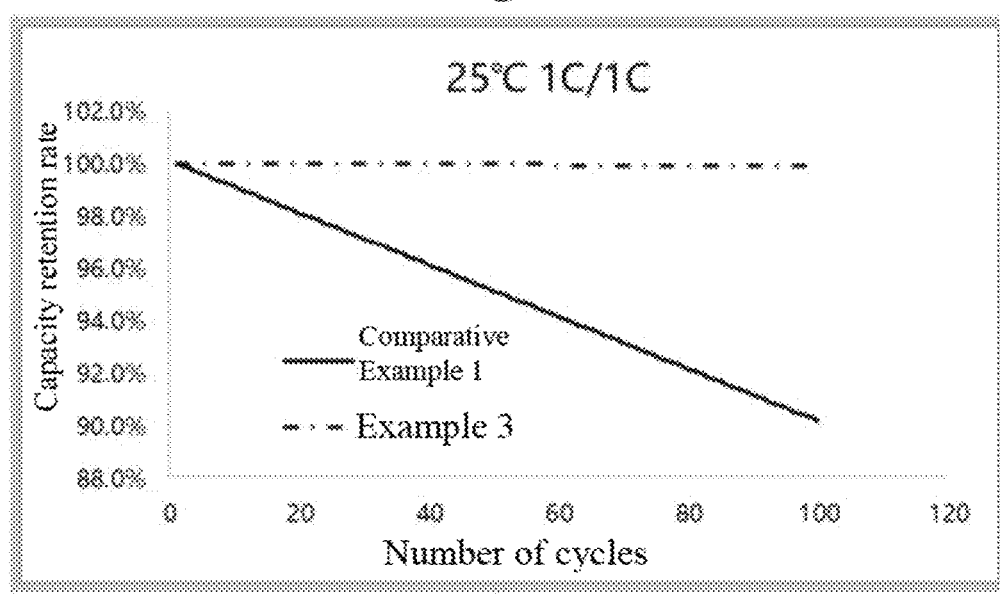
FIG. 4 is a graph of battery capacity retention rate versus number of cycles corresponding to lithium manganate positive electrode active materials of Example 1 and Comparative example 1 of the present application.

Taking Example 1 as an example, the procedures for testing battery capacity retention rate were as follows: at 25° C., the battery corresponding to Example 1 was charged at a constant current of 1/3 C to 4.3V, then charged at a constant voltage of 4.3 V to a current of 0.05 C, stood for 5 min, and then discharged at 1/3 C to 2.8V, and the obtained capacity was recorded as initial capacity C0. The above steps were repeated for the same battery above, and the discharge capacity Cn of the battery after the nth cycle was recorded at the same time, then the battery capacity retention rate after each cycle Pn=Cn/C0*100%, with the 100 point values of $P_1$, $P_2$, ... $P_{100}$ as the ordinates, and the corresponding number of cycles as the abscissas, a graph of capacity retention rate vs number of cycles of the battery corresponding to the lithium manganate positive electrode active material of example 1, as shown in FIG. 4.

During the test, the first cycle corresponded to n=1, the second cycle corresponded to n=2, ... and the 100th cycle corresponded to n=100. The data of battery capacity retention rate corresponding to Example 1 in Table 1 was the data measured after 100 cycles under the above test conditions, that is, the value of $P_{100}$. The test procedures for the Comparative examples 1 and 2 and other Examples were the same as above.

2. Charging Rate Test

Figure 5:
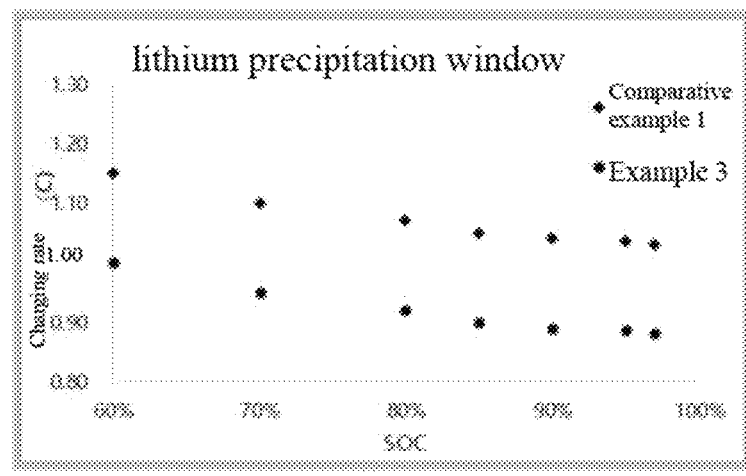
FIG. 5 is a graph of battery charging rate versus state of charge (SOC) corresponding to lithium manganate positive electrode active materials of Example 1 and Comparative example 1 of the present application.

A copper wire (a third electrode) was further placed between the negative electrode and the separator, and the positive electrode, the separator, the negative electrode and the electrolyte solution were prepared into a laminated battery the battery was activated through chemical formation, and the charging rate was test, wherein the specific test method was as follows: 1) calibrating capacity:discharging at a constant current of 1/3 C to 2.8V, standing for 10 min, then charging at a constant current of 1/3 C to 4.3V, then charging at a constant voltage of 4.3V to a current of 0.05 C, standing for 5 min, then discharging at 1/3 C to 2.8V, and the battery capacity at this time was recorded as initial capacity C0; 2) lithium precipitation window test:starting charging from 0% SOC, starting at 2.5 C as the initial rate, by detecting the change of negative potential, and after the negative potential reaching 0 mV, automatically jumping to the next smaller rating test, with the rate interval of 0.1 C, recording the capacity value Cn (n=integer of 1, 2, 3 . . . ) at each charging rate, then SOCn=Cn/C0, and using the SOCn as the abscissas and the corresponding Cn as ordinates to plot a charging rate curve as shown in FIG. 5. On the above curve, the charging rate corresponding to 60% SOC was selected to be the charging rate of the battery of Example 1 of the present application. The test procedures for the Comparative example and other Examples were the same as above.

TABLE 1

Relevant parameters list of the lithium-ion batteries of Examples and Comparative example

| No. | Matrix | Cladding layer | | | | Inner layer:matrix (wt %) | Interlayer:matrix (wt %) |
| --- | --- | --- | --- | --- | --- | --- | --- |
| | | Inner layer | Interlayer | Outer layer | | | |
| Example 1 | $LiMn_2O_4$ | Potassium tetrafluoroaluminate | CMC | Potassium oxalate | Potassium silicate | 1:100 | 0.5:100 |
| Example 2 | $LiMn_2O_4$ | Potassium tetrafluoroaluminate | CMC | Potassium oxalate | Potassium silicate | 1:100 | 1:100 |
| Example 3 | $LiMn_2O_4$ | Potassium tetrafluoroaluminate | CMC | Potassium oxalate | Potassium silicate | 1:100 | 1.5:100 |
| Example 4 | $LiMn_2O_4$ | Potassium tetrafluoroaluminate | CMC | Potassium oxalate | Potassium silicate | 1:100 | 2:100 |
| Example 5 | $LiMn_2O_4$ | Potassium tetrafluoroaluminate | CMC | Potassium oxalate | Potassium silicate | 1:100 | 3:100 |
| Example 6 | $LiMn_2O_4$ | Potassium tetrafluoroaluminate | CMC | Potassium oxalate | Potassium silicate | 1:100 | 0.007:100 |
| Example 7 | $LiMn_2O_4$ | Potassium tetrafluoroaluminate | CMC | Potassium oxalate | Potassium silicate | 1:100 | 5:100 |
| Example 8 | $LiMn_2O_4$ | Potassium aluminate | SA | Potassium oxalate | Potassium silicate | 1:100 | 0.5:100 |
| Example 9 | $LiMn_2O_4$ | Potassium aluminate | SA | Potassium oxalate | Potassium silicate | 1:100 | 0.5:100 |
| Example 10 | $LiMn_2O_4$ | Potassium aluminate | SA | Potassium oxalate | Potassium silicate | 1:100 | 0.5:100 |
| Example 11 | $LiMn_2O_4$ | Potassium aluminate | SA | Potassium oxalate | Potassium silicate | 1:100 | 0.5:100 |
| Example 12 | $LiMn_2O_4$ | Potassium aluminate | SA | Potassium oxalate | Potassium silicate | 1:100 | 0.5:100 |
| Example 13 | $LiMn_2O_4$ | Potassium aluminate | SA | Potassium oxalate | Potassium silicate | 1:100 | 0.5:100 |
| Example 14 | $LiMn_2O_4$ | Potassium aluminate | SA | Potassium oxalate | Potassium silicate | 1:100 | 0.5:100 |
| Example 15 | $LiMn_2O_4$ | Potassium aluminate | PAAS | Potassium oxalate | Potassium silicate | 1:100 | 0.5:100 |
| Example 16 | $LiMn_2O_4$ | Potassium aluminate | PAAS | Potassium oxalate | Potassium silicate | 1:100 | 0.5:100 |
| Example 17 | $LiMn_2O_4$ | Potassium aluminate | PAAS | Potassium oxalate | Potassium silicate | 1:100 | 0.5:100 |
| Example 18 | $LiMn_2O_4$ | Potassium aluminate | PAAS | Potassium oxalate | Potassium silicate | 1:100 | 0.5:100 |
| Example 19 | $LiMn_2O_4$ | Potassium aluminate | PAAS | Potassium oxalate | Potassium silicate | 1:100 | 0.5:100 |
| Example 20 | $LiMn_2O_4$ | Potassium aluminate | PAAS | Potassium oxalate | Potassium silicate | 1:100 | 0.5:100 |
| Example 21 | $LiMn_2O_4$ | Potassium aluminate | PAAS | Potassium oxalate | Potassium silicate | 1:100 | 0.5:100 |
| Example 22 | $LiMn_2O_4$ | Potassium aluminate | PAAS | Potassium oxalate | Potassium silicate | 1:100 | 0.5:100 |
| Example 23 | $LiMn_2O_4$ | Potassium aluminate | PAAS | Potassium oxalate | Potassium silicate | 1:100 | 0.5:100 |
| Example 24 | $LiMn_2O_4$ | Potassium aluminate | PAAS | Potassium oxalate | Potassium silicate | 1:100 | 0.5:100 |
| Example 25 | $LiMn_2O_4$ | Potassium aluminate | PAAS | Potassium oxalate | Potassium silicate | 1:100 | 0.5:100 |
| Example 26 | $LiMn_2O_4$ | Potassium aluminate | PAAS | Potassium oxalate | Potassium silicate | 0.004:100 | 0.5:100 |
| Example 27 | $LiMn_2O_4$ | Potassium aluminate | PAAS | Potassium oxalate | Potassium silicate | 0.01:100 | 0.5:100 |
| Example 28 | $LiMn_2O_4$ | Potassium aluminate | PAAS | Potassium oxalate | Potassium silicate | 0.5:100 | 0.5:100 |
| Example 29 | $LiMn_2O_4$ | Potassium aluminate | PAAS | Potassium oxalate | Potassium silicate | 1:100 | 0.5:100 |
| Example 30 | $LiMn_2O_4$ | Potassium aluminate | PAAS | Potassium oxalate | Potassium silicate | 1.5:100 | 0.5:100 |
| Example 31 | $LiMn_2O_4$ | Potassium aluminate | PAAS | Potassium oxalate | Potassium silicate | 2:100 | 0.5:100 |
| Example 32 | $LiMn_2O_4$ | Potassium aluminate | PAAS | Potassium oxalate | Potassium silicate | 3:100 | 0.5:100 |

TABLE 1-continued

Relevant parameters list of the lithium-ion batteries of Examples and Comparative example

| No. | | | | | | | |
|---|---|---|---|---|---|---|---|
| Example 33 | $LiMn_2O_4$ | Potassium aluminate | PAAS | Potassium oxalate | Potassium silicate | 5:100 | 0.5:100 |
| Example 34 | $LiMn_2O_4$ | Aluminum fluoride | CMC | Potassium oxalate | Potassium silicate | 1:100 | 0.5:100 |
| Example 35 | $LiMn_2O_4$ | Aluminum fluoride | PAAS | Potassium oxalate | Potassium silicate | 1:100 | 0.5:100 |
| Comparative example 1 | $LiMn_2O_4$ | / | / | / | / | / | / |

| | Cladding layer | | | | Battery performance | |
|---|---|---|---|---|---|---|
| No. | Outer layer:matrix (wt %) | Oxalate:Silicate | Volume average particle size D50/μm | Cladding layer thickness/μm | Cycling capacity retention rate (%) | Charging rate (C) |
| Example 1 | 5:100 | 1:1 | 12.7 | 0.7 | 95.2% | 1.05 |
| Example 2 | 5:100 | 1:1 | 12.5 | 1.2 | 99.7% | 1.10 |
| Example 3 | 5:100 | 1:1 | 13.3 | 1.3 | 99.9% | 1 |
| Example 4 | 5:100 | 1:1 | 13.7 | 1.7 | 99.2% | 0.9 |
| Example 5 | 5:100 | 1:1 | 14.0 | 2.0 | 98.1% | 0.85 |
| Example 6 | 5:100 | 1:1 | 12.3 | 0.3 | 94.1% | 1.1 |
| Example 7 | 5:100 | 1:1 | 17.2 | 5.2 | 95.1% | 0.8 |
| Example 8 | 0.005:100 | 1:1 | 12.8 | 0.8 | 95.5% | 1.10 |
| Example 9 | 0.5:100 | 1:1 | 12.9 | 0.9 | 98.0% | 1.08 |
| Example 10 | 1:100 | 1:1 | 13.1 | 1.1 | 99.3% | 1.06 |
| Example 11 | 3:100 | 1:1 | 13.3 | 1.3 | 98.3% | 1.03 |
| Example 12 | 6:100 | 1:1 | 13.4 | 1.4 | 98.0% | 1.00 |
| Example 13 | 12:100 | 1:1 | 13.5 | 1.5 | 97.0% | 0.95 |
| Example 14 | 15:100 | 1:1 | 13.7 | 1.7 | 96.0 | 0.90 |
| Example 15 | 5:100 | 0:1 | 13.0 | 1.0 | 94% | 0.95 |
| Example 16 | 5:100 | 0.01:1 | 13.0 | 1.0 | 94.5% | 0.95 |
| Example 17 | 5:100 | 0.1:1 | 13.1 | 1.1 | 96% | 0.96 |
| Example 18 | 5:100 | 0.25:1 | 13.1 | 1.1 | 98% | 0.96 |
| Example 19 | 5:100 | 0.43:1 | 13.3 | 1.3 | 99% | 0.97 |
| Example 20 | 5:100 | 0.67:1 | 13.4 | 1.4 | 99.5% | 0.99 |
| Example 21 | 5:100 | 2.3:1 | 13.5 | 1.5 | 99.1% | 1.02 |
| Example 22 | 5:100 | 4:1 | 13.5 | 1.5 | 98% | 1.02 |
| Example 23 | 5:100 | 9:1 | 13.6 | 1.6 | 97% | 1.03 |
| Example 24 | 5:100 | 99:1 | 13.7 | 1.7 | 96% | 1.03 |
| Example 25 | 5:100 | 110:1 | 13.8 | 1.8 | 94.5% | 1.04 |
| Example 26 | 5:100 | 1:1 | 13.0 | 1.0 | 95% | 1.10 |
| Example 27 | 5:100 | 1:1 | 13.0 | 1.0 | 96% | 1.08 |
| Example 28 | 5:100 | 1:1 | 13.1 | 1.1 | 97% | 1.06 |
| Example 29 | 5:100 | 1:1 | 13.2 | 1.2 | 99% | 1.05 |
| Example 30 | 5:100 | 1:1 | 13.4 | 1.4 | 98.5% | 1.00 |

TABLE 1-continued

Relevant parameters list of the lithium-ion batteries of Examples and Comparative example

| | | | | | | | |
|---|---|---|---|---|---|---|---|
| Example 31 | | 5:100 | 1:1 | 13.5 | 1.5 | 98% | 0.98 |
| Example 32 | | 5:100 | 1:1 | 13.6 | 1.6 | 97% | 0.96 |
| Example 33 | | 5:100 | 1:1 | 13.7 | 1.7 | 95% | 0.95 |
| Example 34 | | 5:100 | 1:1 | 13.2 | 1.2 | 97.2% | 1.02 |
| Example 35 | | 5:100 | 1:1 | 13.1 | 1.1 | 97% | 1.03 |
| Comparative example 1 | | / | / | / | / | 90% | 1.15 |

Note:
CMC, SA and PAAS represent sodium carboxymethyl cellulose, sodium alginate and sodium polyacrylate, respectively.

TABLE 2

Relevant parameters list of the lithium-ion batteries of Examples and Comparative example

| | | | | Cladding layer | | | |
|---|---|---|---|---|---|---|---|
| | | | | Outer layer | | Inner layer:matrix | Interlayer:matrix |
| No. | Matrix | Inner layer | Interlayer | Oxalate | Silicate | (wt %) | (wt %) |
| Example 36 | $LiMn_2O_4$ | Potassium aluminate | PAAS[0] | Potassium oxalate | Potassium silicate | 1:100 | 0.5:100 |
| Example 37 | $LiMn_2O_4$ | Potassium aluminate | PAAS[1] | Potassium oxalate | Potassium silicate | 1:100 | 0.5:100 |
| Example 38 | $LiMn_2O_4$ | Potassium aluminate | PAAS[2] | Potassium oxalate | Potassium silicate | 1:100 | 0.5:100 |
| Example 39 | $LiMn_2O_4$ | Potassium aluminate | PAAS[3] | Potassium oxalate | Potassium silicate | 1:100 | 0.5:100 |

| | Cladding layer | | Inner layer | | Battery performance | |
|---|---|---|---|---|---|---|
| | Outer | | | | Cycling capacity | |
| No. | layer:matrix (wt %) | Oxalate:Silicate | Average pore size/nm | Porosity % | retention rate (%) | Charging rate (C) |
| Example 36 | 5:100 | 1:1 | 15 | 13% | 98.7% | 0.9 |
| Example 37 | 5:100 | 1:1 | 18 | 18% | 99.3% | 1.12 |
| Example 38 | 5:100 | 1:1 | 19 | 19% | 99.2% | 1.07 |
| Example 39 | 5:100 | 1:1 | 20 | 20% | 98.5% | 1.10 |

Note:
CMC, SA and PAAS represent sodium carboxymethyl cellulose, sodium alginate and sodium polyacrylate, respectively;
[0]No pore-forming agent is used to create pores in the interlayer;
[1]Pore-forming agent is used to create pores in the interlayer;
[2]0.001 mol/L hydrochloric acid is used to etch for 40 minutes;
[3]0.001 mol/L hydrochloric acid is used to etch for 120 minutes.

Taking all the Examples and Comparative example 1 in Table 1 as a whole, the cycling capacity retention rates of the batteries of all the Examples were significantly higher than that of Comparative example 1, although the rate performances were inevitably lower than that of Comparative example 1.

Examples 1-7 in Table 1 reflect the effect of the mass ratio of the interlayer to the lithium manganate matrix on the battery performance. When the mass ratio of the interlayer to the lithium manganate matrix is in a range of 0.5-3:100, the battery had both good cycling capacity retention rate (95% or more) and relatively high charging rate (0.85 C or more); and further, when the mass ratio of the interlayer to the lithium manganate matrix is in a range of 1-2:100, the cycling capacity retention rate of the battery was maintained at 99.2% or more, and while the charging rate is higher (0.9 C or more). However, when the mass ratio of the interlayer to the lithium manganate matrix was lower than 0.5:100 (Example 6, the ratio was 0.007:100) or higher than 3:100 (Example 7, the ratio was 5:100), the cycling capacity retention rate of the battery was only 94.1% and 95.1%, and when the mass ratio of the interlayer to the lithium manganate matrix was 5:100, the charging rate of the battery was only 0.8 C.

Examples 8-14 in Table 1 reflect the effect of the mass ratio of the outer layer to the lithium manganate matrix on the battery performance. When the mass ratio of the outer layer to the lithium manganate matrix is in a range of 0.5-12:100, the battery had both good cycling capacity retention rate (97% or more) and relatively high charging rate (0.95 C or more); and further, when the mass ratio of the outer layer to the lithium manganate matrix is in a range of 0.5-6:100, the cycling capacity retention rate of the battery was maintained at 98% or more, and while having a higher charging rate (1 C or more). However, when the mass ratio of the outer layer to the lithium manganate matrix was lower than 0.5:100 (Example 8, the ratio was 0.005:100) or higher than 12:100 (Example 14, the ratio was 15:100), the cycling capacity retention rate of the battery was only 95.5% and 96%, and when the mass ratio of the outer layer to the lithium manganate matrix was 15:100, the charging rate of the battery was only 0.9 C.

Examples 15-25 in Table 1 reflect the effect of the mass ratio of the oxalate to the silicate in the outer layer on the battery performance. When the mass ratio of the oxalate to the silicate is in a range of 0.01-99:1, the battery had both good cycling capacity retention rate (94.5% or more) and relatively high charging rate (0.95 C or more); and further, when the mass ratio of the oxalate to the silicate is in a range of 0.1-9:1, the cycling capacity retention rate of the battery was maintained at 96% or more, and while having a higher charging rate (0.96 C or more), and still further, when the mass ratio of the oxalate to the silicate is in a range of 0.25-4:100, the cycling capacity retention rate of the battery was maintained at 98% or more, and while having a higher charging rate (0.96 C or more). However, when the mass ratio of the oxalate to the silicate was lower than 0.01:1 (Example 15, the ratio was 0:1) or higher than 99:1 (Example 25, the ratio was 110:1), the cycling capacity retention rate of the battery was only 94% and 94.5%, and when the mass ratio of the oxalate to the silicate was 0:1, the charging rate of the battery was only 0.95 C.

Examples 26-33 in Table 1 reflect the effect of the mass ratio of the inner layer to the lithium manganate matrix on the battery performance. When the mass ratio of the inner layer to the lithium manganate matrix is in a range of 0.01-3:100, the battery had both good cycling capacity retention rate (more than 95%) and relatively high charging rate (more than 0.95 C); and further, when the mass ratio of the inner layer to the lithium manganate matrix is in a range of 1-2:100, the cycling capacity retention rate of the battery was maintained at 98% or more, and while the charging rate is higher (not lower than 0.98 C). However, when the mass ratio of the inner layer to the lithium manganate matrix was lower than 0.001:100 (Example 26, the ratio was 0.004:100) or higher than 3:100 (Example 33, the ratio was 5:100), the cycling capacity retention rate of the battery was only 95%, and when the mass ratio of the inner layer to the lithium manganate matrix was 5:100, the charging rate of the battery was only 0.95 C.

Example 34 and Example 35 in Table 1 also show that when the inner layer was aluminum fluoride, the cycling capacity retention rate of the battery was maintained at 97% or more, while the charging rate was 1 C or more.

Examples 37-39 in Table 2 reflect the effect of pore-forming and etching of the lithium manganate positive electrode active material on the battery performance. As shown in Examples 36-37, the pore-forming treatment effectively improved the pore channel structure of the lithium manganate positive electrode active material (the average pore size increased from 15% to 18%, and the porosity increased from 13% to 18%), and the cycling capacity retention rate and charging rate (increasing from 0.9 C to 1.12 C) of the corresponding battery were also significantly improved. As shown in Example 36 and Examples 38-39, the etching treatment effectively improved the charging rate of the battery (increasing from 0.9 C to 1.07 C, 1.10 C), and an appropriate amount of etching treatment time also facilitated the improvement of the cycling capacity retention rate of the battery (Example 38).

It should be noted that the present application is not limited to the above-mentioned embodiments. The above-mentioned embodiments are only for illustration, and within the technical solution of the present application, embodiments having substantially the same configuration as the technical idea and exerting the same effects are all included within the technical scope of the present application. In addition, various modifications to the embodiments that can be conceived by those skilled in the art without departing from the scope of the spirit of the present application and other embodiments constructed by combining some constituent elements in the embodiments are also included in the scope of the present application.

What is claimed is:

1. A lithium manganate positive electrode active material comprising a lithium manganate matrix and a cladding layer, wherein the cladding layer comprises an inner layer provided on the surface of the lithium manganate matrix, an interlayer provided on the surface of the inner layer, and an outer layer provided on the surface of the interlayer, wherein,
    the inner layer comprises one or more of oxyacid salt of aluminum, calcium and/or magnesium, wherein
    the oxyacid salt of aluminum, calcium and/or magnesium is selected from one or more of potassium aluminate, magnesium aluminate, calcium carbonate, calcium aluminate, magnesium carbonate, and magnesium aluminate;
    the interlayer is an organic bonding material layer; and
    the outer layer is an oxalate and/or silicate layer, wherein
    the lithium manganate positive electrode active material has a multi-level pore structure with an average pore size of 15-20 nm and a porosity of 10-20%.

2. The lithium manganate positive electrode active material according to claim 1, wherein,
    the organic bonding material is selected from one or more of carboxymethyl cellulose salt, alginate salt, and polyacrylate salt.

3. The lithium manganate positive electrode active material according to claim 1, wherein,
    the oxalate is selected from an alkali metal salt, an alkaline earth metal salt or an ammonium salt of oxalic acid;
    the silicate is selected from an alkali metal salt, an alkaline earth metal salt or an ammonium salt of silicic acid.

4. The lithium manganate positive electrode active material according to claim 1, wherein,
    the mass ratio of the inner layer to the lithium manganate matrix is 0.01-3:100;
    optionally, the mass ratio of the interlayer to the lithium manganate matrix is 0.5-3:100; and
    optionally, the mass ratio of the outer layer to the lithium manganate matrix is 0.5-12:100.

5. The lithium manganate positive electrode active material according to claim 1, wherein,
    the mass ratio of the inner layer:interlayer:outer layer is 1-2:1-2:0.5-6.

6. The lithium manganate positive electrode active material according to claim 1, wherein,
the mass ratio of the oxalate to the silicate is 0.01-99:1.

7. The lithium manganate positive electrode active material according to claim 1, wherein,
the lithium manganate positive electrode active material has a volume average particle size D50 of 12-14 μm.

8. The lithium manganate positive electrode active material according to claim 1, wherein,
the interlayer has a rough surface obtained by hydrochloric acid etching.

9. The lithium manganate positive electrode active material according to claim 1, wherein,
the cladding layer has a thickness of 0.3-5.2 μm.

10. A positive electrode sheet, wherein,
the positive electrode sheet comprises the lithium manganate positive electrode active material according to claim 1.

11. The positive electrode sheet according to claim 10, wherein,
the positive electrode sheet comprises a ternary nickel-cobalt-manganese material, and the mass ratio of the ternary nickel-cobalt-manganese material to the lithium manganate positive electrode active material is 0.01-0.99:1.

12. A lithium-ion battery comprising one or more of the lithium manganate positive electrode active material according to claim 1.

13. A battery module comprising the lithium-ion battery of claim 12.

14. A lithium manganate positive electrode active material comprising a lithium manganate matrix and a cladding layer, wherein the cladding layer comprises an inner layer provided on the surface of the lithium manganate matrix, an interlayer provided on the surface of the inner layer, and an outer layer provided on the surface of the interlayer, wherein,
the inner layer comprises one or more of fluoride of aluminum, calcium and/or magnesium;
the interlayer is an organic bonding material layer; and
the outer layer is an oxalate and/or silicate layer.

15. The lithium manganate positive electrode active material according to claim 14, wherein,
the fluoride is one or more of aluminum fluoride, calcium fluoride, and magnesium fluoride.

* * * * *